United States Patent
Komatsu et al.

(10) Patent No.: US 9,965,896 B2
(45) Date of Patent: May 8, 2018

(54) DISPLAY DEVICE AND DISPLAY METHOD

(71) Applicant: FUJITSU LIMITED, Kawasaki-shi, Kanagawa (JP)

(72) Inventors: Ryouta Komatsu, Yokohama (JP); Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 14/829,207

(22) Filed: Aug. 18, 2015

(65) Prior Publication Data

US 2015/0356789 A1 Dec. 10, 2015

Related U.S. Application Data

(63) Continuation of application No. PCT/JP2013/001003, filed on Feb. 21, 2013.

(51) Int. Cl.
*G09G 5/00* (2006.01)
*G06T 19/00* (2011.01)
(Continued)

(52) U.S. Cl.
CPC .............. *G06T 19/006* (2013.01); *G06T 7/74* (2017.01); *G06T 11/60* (2013.01); *G06T 2200/04* (2013.01); *G06T 2207/30204* (2013.01)

(58) Field of Classification Search
None
See application file for complete search history.

(56) References Cited

U.S. PATENT DOCUMENTS

2002/0010655 A1* 1/2002 Kjallstrom ............. G06Q 30/02
705/26.62
2002/0052709 A1 5/2002 Akatsuka et al.
(Continued)

FOREIGN PATENT DOCUMENTS

JP 08-123983 A 5/1996
JP 2001-209826 A 8/2001
(Continued)

OTHER PUBLICATIONS

Extended European Search Report dated Jul. 5, 2016 in Patent Application No. 13875830.5.
(Continued)

*Primary Examiner* — Frank Chen
(74) *Attorney, Agent, or Firm* — Oblon, McClelland, Maier & Neustadt, L.L.P.

(57) ABSTRACT

A display method includes: detecting a specific object from an input image captured by a camera; generating display data for rendering a plan view, a first display component, and a second display component based on a positional relationship between the camera and the specific object, the plan view corresponding to a first plane which is different from a second plane projected on the input image, the first display component being displayed at a camera position on the first plane, and the second display component being displayed at a reference object position on the first plane; receiving a designation of a point on the plane view; converting a designated position on the first plane into another position on depth direction to the second plane; generating positional information indicating three dimensional position of an augmented reality content based on the another position.

11 Claims, 30 Drawing Sheets

(51) Int. Cl.
*G06T 11/60* (2006.01)
*G06T 7/73* (2017.01)

(56) References Cited

U.S. PATENT DOCUMENTS

| | | | |
|---|---|---|---|
| 2005/0264433 A1 | 12/2005 | Yokokohji et al. | |
| 2006/0013436 A1 | 1/2006 | Takahashi et al. | |
| 2006/0086797 A1 | 4/2006 | Saito et al. | |
| 2008/0285854 A1 | 11/2008 | Kotake et al. | |
| 2011/0199479 A1* | 8/2011 | Waldman | G01C 21/3602 348/116 |
| 2011/0304646 A1 | 12/2011 | Kato et al. | |
| 2011/0313779 A1* | 12/2011 | Herzog | G06Q 10/10 705/1.1 |
| 2012/0218263 A1 | 8/2012 | Meier et al. | |
| 2014/0361988 A1* | 12/2014 | Katz | G06F 3/011 345/156 |

FOREIGN PATENT DOCUMENTS

| | | |
|---|---|---|
| JP | 2002-092647 A | 3/2002 |
| JP | 3413145 B2 | 3/2003 |
| JP | 2003-141558 A | 5/2003 |
| JP | 2005-010998 A | 1/2005 |
| JP | 2005-083826 A | 3/2005 |
| JP | 2005-135355 A | 5/2005 |
| JP | 2005-339127 A | 12/2005 |
| JP | 2008-065807 A | 3/2008 |
| JP | 2010-267254 A | 11/2010 |
| JP | 2011-258120 A | 12/2011 |

OTHER PUBLICATIONS

International Search Report dated Mar. 19, 2013 in PCT/JP2013/001003 filed Feb. 21, 2013 with English Translation.
Written Opinion dated Mar. 19, 2013 in PCT/JP2013/001003 filed Feb. 21, 2013with English translation.
Office Action dated Apr. 26, 2016 in Japanese Patent Application No. 2015-501069 (with partial English language translation).
Communication pursuant to Article 94(3) EPC dated Jun. 23, 2017 in European Patent Application No. 13 875 830.5.

\* cited by examiner

FIG. 3

$$M = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

| MARKER ID | Xc | Yc | Zc | Pc | Qc | Rc | OBJECT ADDITIONAL FLAG |
|---|---|---|---|---|---|---|---|
| 100 | X1c | Y1c | Z1c | P1c | Q1c | R1c | 1 |
| ... | ... | ... | ... | ... | ... | ... | ... |
| | | | | | | | |

FIG. 15

| TEMPLATE ID | | 10 | |
|---|---|---|---|
| TOP POINT COORDINATE | 0 | (0, 0, 0) | T21 |
| | 1 | (X3m, Y3m, Z3m) | |
| | 2 | (X4m, Y4m, Z4m) | |
| | 3 | (X5m, Y5m, Z5m) | |
| | 4 | (X6m, Y6m, Z6m) | |
| | 5 | ... | |
| | 6 | ... | |
| | 7 | ... | |
| | ... | ... | |
| 1 | ORDER OF TOP POINTS | 1, 3, 4, 5, 7 | T22 |
| | TEXTURE ID | 21 | |
| 2 | ORDER OF TOP POINTS | 2, 3, 4, 5, 6 | |
| | TEXTURE ID | 21 | |
| ... | ORDER OF TOP POINTS | ... | |
| | TEXTURE ID | ... | |

FIG. 16

| OBJECT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| 1000 | 121.5 | 510.0 | 860.5 | 0.0 | 0.0 | 0.0 | 1.0 | 1.0 | 1.0 | 10 | 100 | TEXT: THERE IS CRACK! |
| ⋮ | ⋮ | ⋮ | ⋮ | ⋮ | ⋮ | ⋮ | ⋮ | ⋮ | ⋮ | ⋮ | ⋮ | ⋮ |

| OBJECT ID | | 1001 | |
|---|---|---|---|
| TEMPLATE ID | | 10 | |
| POSITION | Xm | 121.5 | T41 |
| | Ym | 510.0 | |
| | Zm | 860.5 | |
| ROTATION | Pm | 0.0 | |
| | Qm | 0.0 | |
| | Rm | 0.0 | |
| MAGNIFICATION | Jx | 1.0 | |
| | Jy | 1.0 | |
| | Jz | 1.0 | |
| POSITION | Xc | 456.5 | T42 |
| | Yc | 204.0 | |
| | Zc | 1065.5 | |
| ROTATION | Pc | 0.0 | |
| | Qc | 0.0 | |
| | Rc | 0.0 | |
| FLAG α | | 0 | |

T4

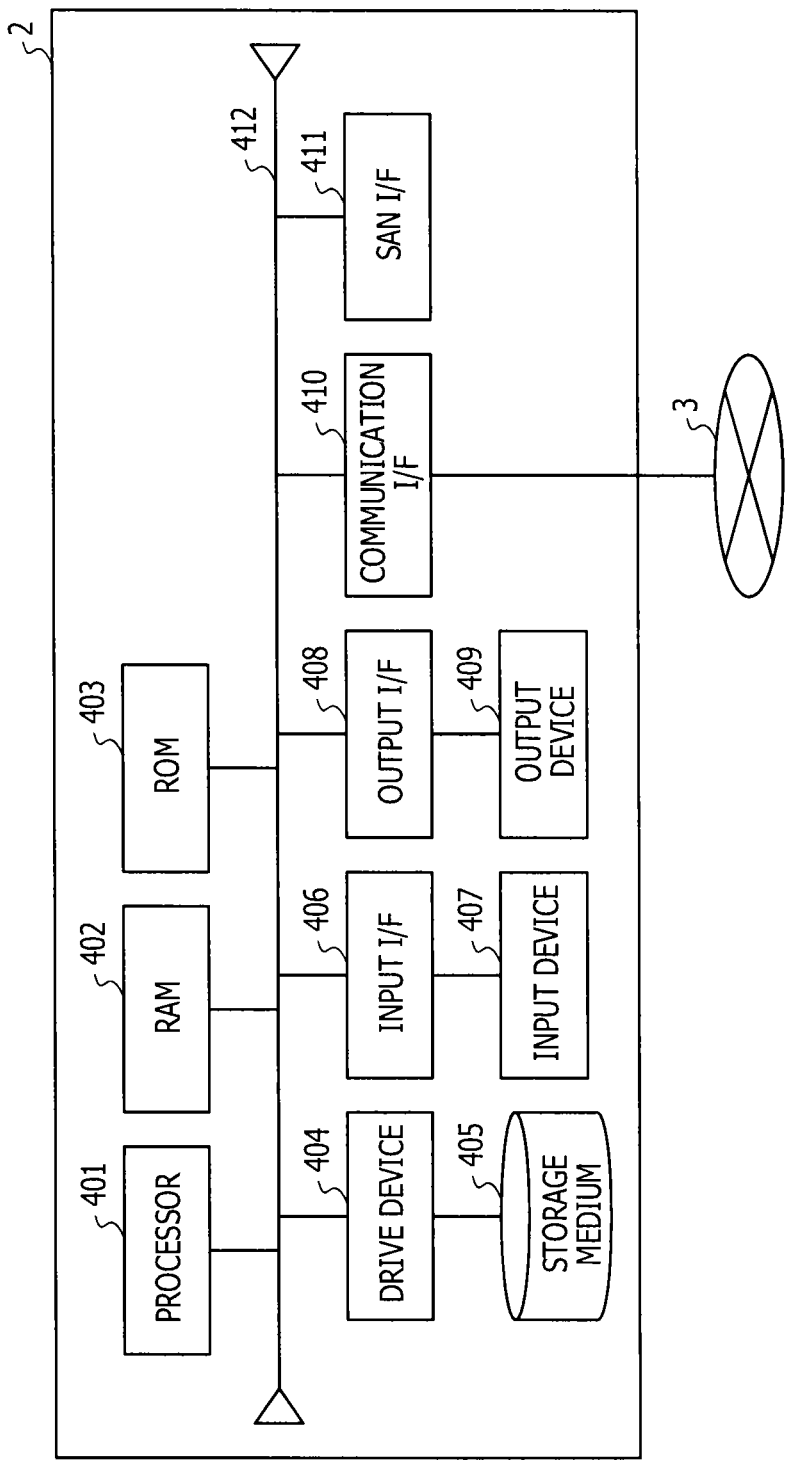

DISPLAY DEVICE AND DISPLAY METHOD

CROSS-REFERENCE TO RELATED APPLICATION

This application is a continuation application of International Application PCT/JP2013/001003 filed on Feb. 21, 2013 and designated the U.S., the entire contents of which are incorporated herein by reference.

FIELD

The present invention relates to a technique for specifying a position in a space.

BACKGROUND

A portion of a captured image obtained by an imaging apparatus is displayed being overlapped by another image. For example, a print sealing machine is an image printing apparatus in which a user is imaged by the imaging apparatus, the obtained captured image is synthesized with a frame image prepared in advance, and the synthesized image is provided by printing the image on a sealing sheet and the like. Further, the print sealing machine is configured such that the user may edit arbitrary characters or figures (stamp images) on the captured image with an accompanying pen (a so-called scribbling function). The stamp images are drawn at a position where a touch pen comes into contact with a touch panel (for example, see Japanese Laid-open Patent Publication No. 2003-141558).

Furthermore, an AR object that is model data of a three-dimensional object disposed in a three-dimensional virtual space corresponding to a real space is displayed so as to overlap the captured image that is imaged by the imaging apparatus. This technique is referred to as an augmented reality (AR) technique since information gathered by human perception (visual sense and the like) is augmented. The position of the AR object is set on the virtual space corresponding to the real space, a projection image of the AR object is generated based on a positional relationship between the imaging apparatus and the AR object, and the generated projection image is displayed to overlap the captured image. The position of the AR object in the virtual space is set in advance (for example, see Japanese Laid-open Patent Publication No. 2002-092647).

SUMMARY

According to an aspect of the invention, a display method executed by a computer, the display method includes: displaying an input image; receiving a first designation of a first point on the input image; detecting a specific object from an input image captured by a camera; generating display data for rendering a plan view, a first display component, and a second display component based on a positional relationship between the camera and the specific object, the plan view corresponding to a first plane which is different from a second plane projected on the input image, the first display component corresponding to the camera and being displayed at a camera position on the first plane, and the second display component corresponding to the reference object and being displayed at a reference object position on the first plane; displaying the plan view, the first display component, and the second display component on a display based on the display data; receiving a second designation of a second point on the plane view corresponding to the first plane; acquiring a position of the point; converting the position on the first plane into another position on depth direction to the second plane; generating positional information indicating three dimensional position of an augmented reality content based on the another position and the first point; and storing the positional information and the augmented reality content into a memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a conversion matrix M from a marker coordinate system to a camera coordinate system and a rotation matrix R in the conversion matrix M.

FIG. 4 illustrates rotation matrixes R1, R2, and R3.

FIG. 14 illustrates a marker management table T1.

FIG. 15 illustrates a definition table T2.

FIG. 16 illustrates a management table T3.

FIG. 17 illustrates an edition table T4.

FIG. 30 illustrates an example of hardware configurations of the management server 2.

DESCRIPTION OF EMBODIMENTS

When setting the AR object that is displayed by being registered with an object present in the real space, work of measuring the coordinates specifying the position of the AR object is performed. Furthermore, even if the measuring work is performed, when deviation occurs in the position specification, the display is performed in a state where the object that is a target to be displayed by being registered with the AR object and the AR object are deviated from each other. If the deviation in the position specification occurs, the measuring work is performed again to specify a correct position.

In one aspect of the disclosure, an object of the disclosure is to provide a standard corresponding to a real space for the position specification in a depth direction of an imaging screen.

First, an AR technique, in which an AR object disposed in a three-dimensional virtual space corresponding to real space is displayed to overlap a captured image that is imaged by a camera, will be described.

For example, the AR object is model data including a plurality of points. A pattern (texture) is set for each of a plurality of surfaces obtained by interpolating the plurality of points by straight lines or curves. A three-dimensional model is formed by synthesizing the plurality of surfaces. An arrangement of the AR object on the virtual space is performed by determining coordinates of each point configuring the AR object based on a reference object present within the real space. The object is not present at a position of the coordinate of each point in the real space, but the coordinate of each point is determined in the virtual space based on the reference object.

While the AR object is disposed in the virtual space, a positional relationship between the camera and the reference object is obtained in the real space based on an appearance (image) of the reference object projected within the captured image that is imaged by the camera. A positional relationship between the camera and the coordinate of each point of the AR object in the three-dimensional virtual space corresponding to the real space is obtained by the coordinate in the virtual space based on the reference object present within the real space and the positional relationship between the camera and the reference object in the real space. The image of the AR object obtained when the camera captures the AR object on the virtual space is calculated based on the positional relationships. Calculation for calculating the image of the AR object will be described with reference to FIGS. 1 to 4.

Figure 1:
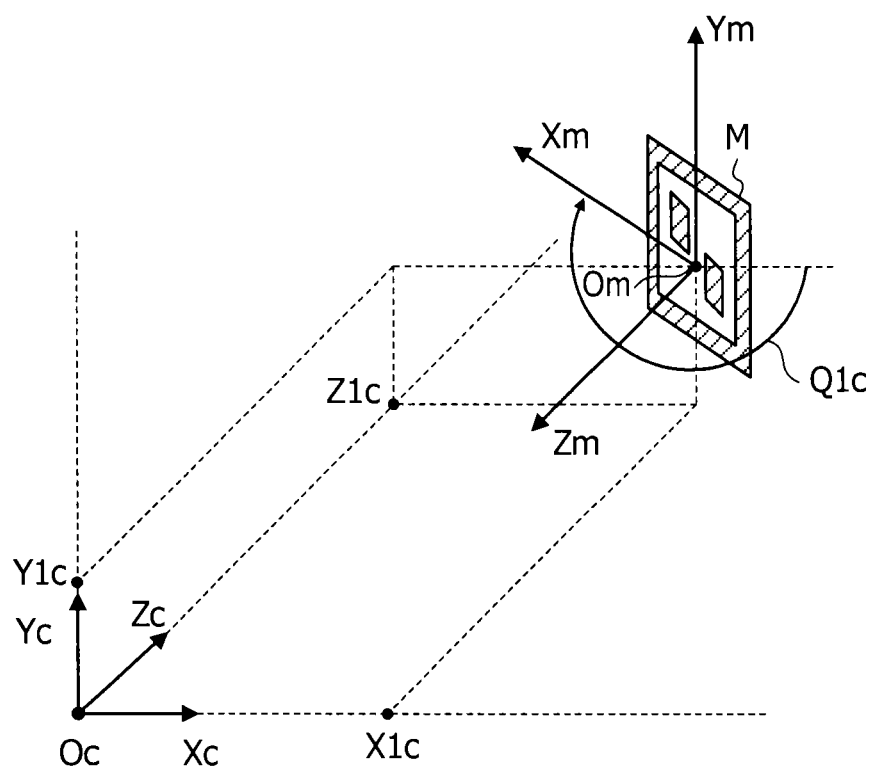
FIG. 1 illustrates a relationship between a camera coordinate system and a marker coordinate system.

FIG. 1 illustrates a relationship between a camera coordinate system and a marker coordinate system. A marker M illustrated in FIG. 1 is an example of the reference object used for displaying the AR object. The marker M illustrated in FIG. 1 has a square shape and a size thereof is determined (for example, a length of one side is 10 cm and the like) in advance. The marker M illustrated in FIG. 1 has a square shape, but an object with another shape, in which a relative position and orientation from the camera may be determined even based on an image obtained by imaging from any of a plurality of viewpoints, may be used as the reference object. For example, feature points generated from the captured image and the like may be used as the reference object.

The camera coordinate system is configured of three dimensions of (Xc, Yc, Zc) and, for example, a focus of the camera is an original point (original point Oc). For example, an Xc-Yc plane of the camera coordinate system is a surface parallel to an imaging element surface of the camera and a Zc axis is an axis perpendicular to the imaging element surface.

The marker coordinate system is configured of three dimensions of (Xm, Ym, Zm) and, for example, a center of the marker M is an original point (original point Om). For example, an Xm-Ym plane of the marker coordinate system is a surface parallel to the marker M and a Zm axis is an axis perpendicular to the surface of the marker M. The original point Om is indicated by a coordinate V1c (X1c, Y1c, Z1c) in the camera coordinate system. Furthermore, a rotational angle of the marker coordinate system with respect to the camera coordinate system (Xc, Yc, Zc) is indicated by a rotary coordinate G1c (P1c, Q1c, R1c). The P1c is a rotational angle around the Xc axis, the Q1c is a rotational angle around the Yc axis, and the R1c is a rotational angle around the Zc axis. Since the marker coordinate system illustrated in FIG. 1 rotates only around the Ym axis, both the P1c and the R1c are 0.

Figure 2:
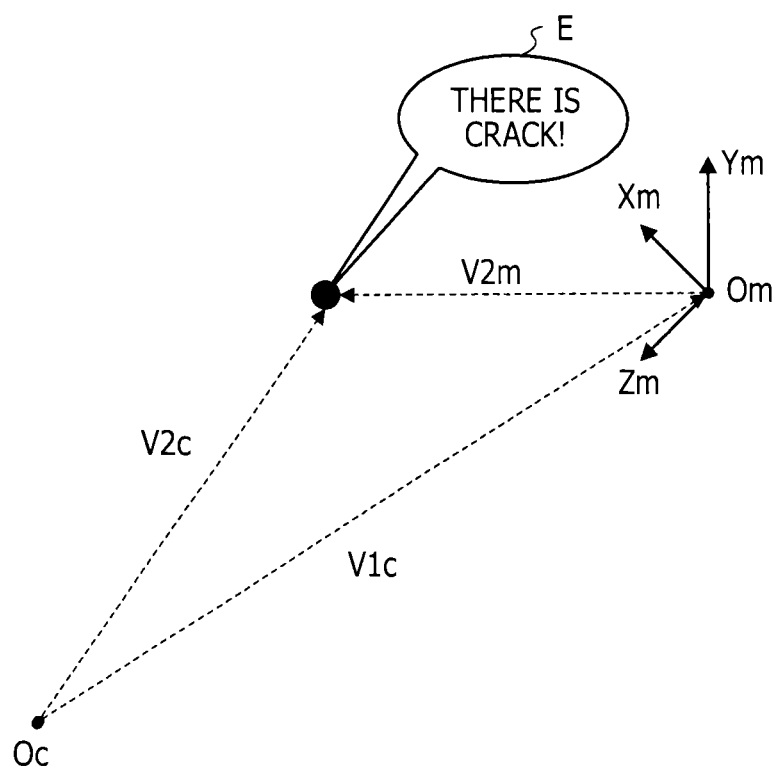
FIG. 2 illustrates an example of AR object E in a camera coordinate system and a marker coordinate system.

FIG. 2 illustrates an example of an AR object E in the camera coordinate system and the marker coordinate system. The AR object E illustrated in FIG. 2 is an object of a balloon shape and includes text data of "there is a crack!" within the balloon. A black circle of a point of the balloon of the AR object E indicates a reference point of the AR object E. A coordinate of the AR object E in the marker coordinate system is V2m (x2m, y2m, z2m). Furthermore, orientation of the AR object E is determined by a rotary coordinate G2m (P2m, Q2m, R2m) and a size of the AR object E is determined by a magnification D (Jx, Jy, Jz).

The coordinate of each point configuring the AR object E is a coordinate in which the coordinate of each point defined by definition data (AR template) that is a model of the AR object E is adjusted based on the coordinate V2m of the reference point, the rotary coordinate G2m, and the magnification D. The coordinate of the point that is defined in the AR template is indicated as a state of (0, 0, 0). Each coordinate included in the AR template is rotated based on the rotary coordinate G2m that is set, is scaled by the magnification D, and is adjusted by being moved in parallel based on the coordinate V2m of the reference point. The AR object E of FIG. 2 indicates a state in which each point defined in the AR template is configured based on the point adjusted based on the coordinate V2m of the reference point, the rotary coordinate G2m, and the magnification D.

The coordinate of each point of the AR object E of which the coordinate is set in the marker coordinate system is converted into the camera coordinate system, a position within a screen is calculated based on the coordinate of the camera coordinate system, and thereby an image of the AR object E is generated.

The coordinate of each point included in the AR object E in the camera coordinate system is calculated by coordinate conversion (model-view conversion) of the coordinate of each point in the marker coordinate system based on the coordinate V1c and the rotary coordinate G1c. For example, the model-view conversion is performed with respect to the coordinate V2m and thereby a coordinate V2c (X2c, Y2c, Z2c) of the reference point in the camera coordinate system is obtained.

FIG. 3 illustrates a conversion matrix M from the marker coordinate system to the camera coordinate system and a rotation matrix R in the transport mechanism M. The conversion matrix M is a matrix of 4×4. A column vector (Xc, Yc, Zc, 1) is obtained by a product of the conversion matrix M and a column vector (Xm, Ym, Zm, 1). That is, the column vector (Xc, Yc, Zc, 1) including the point coordinate of the camera coordinate system by performing matrix calculation by substituting the point coordinate of the camera coordinate system of an object of the coordinate conversion (the model-view conversion) to the column vector (Xm, Ym, Zm, 1). A partial matrix (rotation matrix R) of first to third rows and first to third columns of the conversion matrix M acts on the coordinate of the marker coordinate system and thereby a rotating operation is performed for aligning the orientation of the marker coordinate system and the orientation of the camera coordinate system. The partial matrix of the first to third rows and a fourth column of the conversion matrix M acts and thereby a translational operation is performed for aligning the orientation of the marker coordinate system and the position of the camera coordinate system.

FIG. 4 illustrates rotation matrixes R1, R2, and R3. The rotation matrix R illustrated in FIG. 3 is calculated by a product (R1·R2·R3) of the rotation matrixes R1, R2, and R3.

The coordinate (Xm, Ym, Zm) of each point configuring the AR object E of the marker coordinate system is converted to the coordinate (Xc, Yc, Zc) of the camera coordinate system by the model-view conversion based on the conversion matrix M. As described above, the coordinate V2m is converted to the coordinate V2c by the model-view conversion. The coordinate (Xc, Yc, Zc) obtained by the model-view conversion indicates a relative position from the camera if the camera is present in the virtual space in which the AR object E is present.

A screen coordinate system is configured of two dimensions of (Xs, Ys) and, for example, a center of the captured image obtained by an imaging process of the camera is an original point (original point Os). The coordinate of each point of the AR object E of the camera coordinate system is converted to the screen coordinate system. The image of the AR object E is generated based on the coordinate of each point of the screen coordinate system obtained by the coordinate conversion (perspective conversion).

The coordinate conversion (the perspective conversion) from the camera coordinate system to the screen coordinate system is, for example, performed based on a focal length f of the camera. An Xs coordinate of the coordinate of the screen coordinate system corresponding to the coordinate (Xc, Yc, Zc) in the camera coordinate system is obtained by Xs=f·Xc/Zc. Furthermore, a Ys coordinate of the coordinate of the screen coordinate system corresponding to the coordinate (Xc, Yc, Zc) in the camera coordinate system is obtained by Ys=f·Yc/Zc.

The image of the AR object E is generated based on the coordinate (screen coordinate system) obtained by performing the perspective conversion in the coordinate (camera coordinate system) of each point configuring the AR object E. The AR object E is generated by mapping a texture on a surface obtained by interpolating the plurality of points configuring the AR object E. It is defined that a surface is formed by interpolating which point and a rear texture is mapped on which surface, in the AR template that is the origin of the AR object E.

The coordinate on the captured image corresponding to the coordinate of the marker coordinate system is calculated by the model-view conversion and the perspective conversion described above, and the image of the AR object E corresponding to a viewpoint of the camera is generated by using the coordinate on the captured image. The image of the generated AR object E is referred to as a projection image of the AR object E. The projection image of the AR object E is synthesized in the captured image and thereby visual information to be supplied to the user is enhanced. Furthermore, in another aspect, the projection image of the AR object E is displayed on a transmissive display. Also in the aspect, image of the real space obtained by transmitting display by the user and the projection image of the AR object are aligned and thereby the visual information to be supplied to the user is enhanced.

In the embodiment, specification of the position and the orientation of the AR object E that is an object to which the AR technique is applied are performed by a computer 1 having a camera function and a display function. The computer 1 performs specification of the position and the orientation of the AR object E according to an input from the user.

Figure 5:
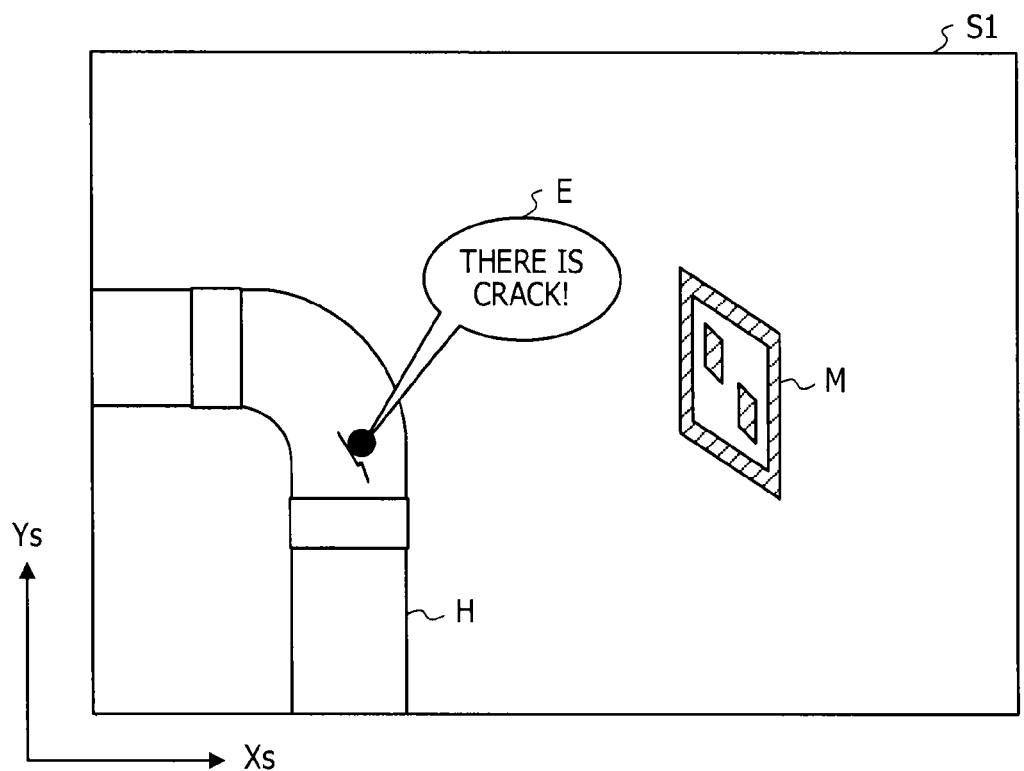
FIG. 5 illustrates an example of a display screen.

FIG. 5 illustrates an example of a display screen. A display screen S1 of FIG. 5 is an example of a screen in which the projection image of the AR object E, and the captured image including the image of the marker M and the image of an object H are synthesized and displayed. For example, the captured image is an image obtained by the camera function of the computer 1.

The captured image exemplified in the display screen S1 is an image imaged within a factory and the object H projected within the captured image is a curved pipe. A crack occurs at a curved portion of the object H. If a crack and the like occur in maintenance work of the factory and the like, recording is performed as a report item indicating a cracking place. The AR object E of the balloon shape including a message of "there is a crack!" is set at a position aligned to the cracking place and thereby the recording of the report item is performed. Thereafter, the user assessing the factory may receive indication of the cracking place by viewing a screen on which the projection image of the AR object E set by a previous worker is synthesized to the captured image including the images of the marker M and the object H. For example, data of the set AR object E is uploaded to a management server and, thereafter, a computer which is operated by the user assessing a site downloads and receives the data of the AR object E from the management server before the user is on-site.

The computer 1 obtains the position coordinate V1c and the rotary coordinate G1c of the marker M with respect to the camera included in the computer 1 based on the image (shape and size) of the marker M included in the captured image. Furthermore, information such as identification information (marker ID) of the marker is read by the computer 1 based on the shape of the marker M. If the feature points of the image as the reference object are used, for example, the computer 1 maintains association between the information of the feature points and the marker ID in advance, and obtains the marker ID based on an association relationship therebetween. In the embodiment, the position and the orientation of the marker M are fixed within the real space.

The coordinate (camera coordinate system) of the AR object E is obtained by performing the model-view conversion of the coordinate (marker coordinate system) of each point set in the AR object E based on the position coordinate V1c and the rotary coordinate G1c. The computer 1 generates the projection image of the AR object E based on the coordinate of the screen coordinate system obtained by performing the perspective conversion of the coordinate (camera coordinate system) of each point of the AR object E. The coordinate conversion is the same as the above description. The computer 1 generates the image (projection image) of the AR object in a virtual situation that the AR object E is viewed from the viewpoint of the camera of the computer 1. Furthermore, the computer 1 may make the AR object be viewed as if it is present in the real space by synthesizing the generated projection image to the captured image.

As described above, the AR technique, in which the projection image of the AR object E is displayed by synthesizing to the captured image, is used for extending information collected by the human perception. Information regarding the object present in the real space is added in the display screen S1 exemplified in FIG. 5 by the AR object E adding the balloon of "there is a crack!" at the cracking portion of the pipe.

However, if deviation occurs in the position specification with respect to the AR object E, since an additional object of information by the projection image of the AR object is not indicated, the purpose of adding information with respect to the object present in the real space may not be fulfilled any longer. For example, if the AR object E is disposed at a position different from the cracking portion, the user receiving the report by the AR object E may not find the crack. Furthermore, if the AR object E is specified in a position of the object that is different from the object of the additional object of the information, erroneous information is provided. For example, if the AR object E is disposed at a different position of the pipe, when receiving the report by the AR object E, extra work has to be performed to confirm whether or not the crack is present with respect to a place where the crack is not present. Thus, setting the position and the orientation of the AR object E may align the AR object E to the real space to the extent that the user receiving the report by the AR object E is capable of grasping the association relationship between the AR object E and the object (for example, the cracking place) within the real space.

For example, setting of the position of the projection image of the AR object E is performed by specifying the position within the display screen S1. According to such a specifying method, the user may confirm a positional relationship between the projection image of the AR object E and the cracking place of the object H within the display screen S1. Thus, the user performs position specification while confirming the screen and thereby the projection image of the AR object E is disposed at a position where the projection image of the AR object E is aligned to the cracking place of the object H in the display screen S1.

Figure 6:
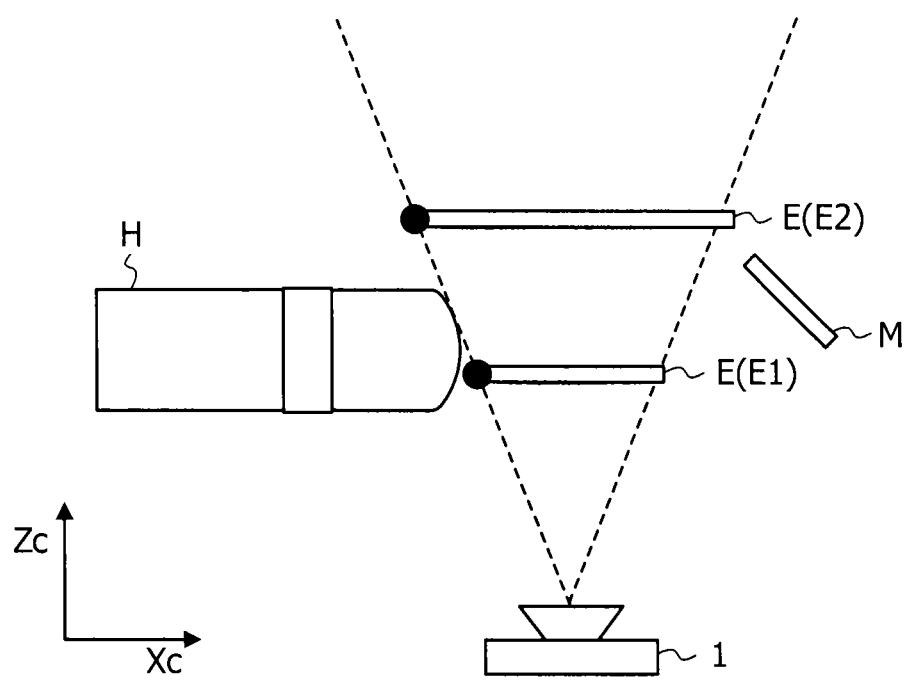
FIG. 6 illustrates an arrangement example of AR object E.

FIG. 6 illustrates an arrangement example of the AR object E. The arrangement example of FIG. 6 illustrates the positional relationship of the state where the computer 1, the marker M, the object H, and the AR object E exemplified in FIG. 5 are seen from above. For example, FIG. 6 is a view in which the computer 1, the marker M, the object H, and the AR object E are projected and illustrated in the two-dimensional space of the Xc axis and the Zc axis of the camera coordinate system.

FIG. 6 illustrates two examples as the arrangement of the AR object E exemplified in FIG. 5. As an example of the AR object E that is the projection image illustrated in FIG. 5, the AR object E (E1) that is arranged in front of the computer 1 is illustrated in FIG. 6. Furthermore, as another example, the AR object E (E2) that is arranged in the back thereof is illustrated. For both AR objects E in the arrangement, the projection images generated by the computer 1 of the position illustrated in FIG. 6 are the same. Thus, even if the AR object is arranged in any position specification, it is a state where the positions of the AR objects E may not be determined in the projection image within the display screen S1. That is, even if the position of the AR object E is set within the display screen S1 illustrated in FIG. 5, it is not determined whether the AR object E is arranged as the AR object E (E1) or arranged as the AR object E (E2). If the AR object E is arranged as the AR object E (E1), the AR object E is set at the position which is aligned to the crack of the pipe. On the other hand, if the AR object E is arranged as the AR object E (E2), the AR object E is set at the position (substantially distant position) which is not aligned to the pipe.

Figure 7:
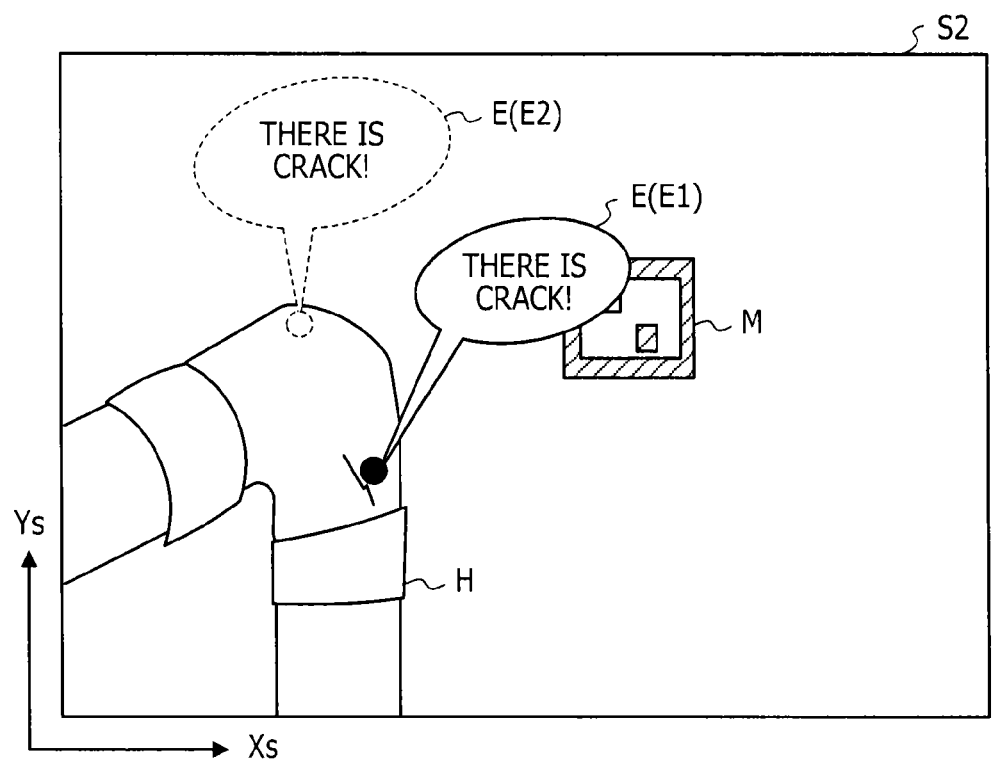
FIG. 7 illustrates an example of a display screen.

FIG. 7 illustrates an example of the display screen. Similar to the display screen S1, a display screen S2 illustrated in FIG. 7 is also a screen in which the captured image imaged by the camera function of the computer 1 and the projection image of the AR object E are synthesized and displayed. The images of the AR object E (E1) and the AR object E (E2) within the display screen S2 are the projection images corresponding to the AR object E (E1) and the AR object E (E2) illustrated in FIG. 6. The captured image of the display screen S2 is a captured image imaged at a position different from the captured image of the display screen S1. For example, the user assessing the site after the AR object E is set may confirm the AR object E at an angle of viewing such as the display screen S2.

Figure 8:
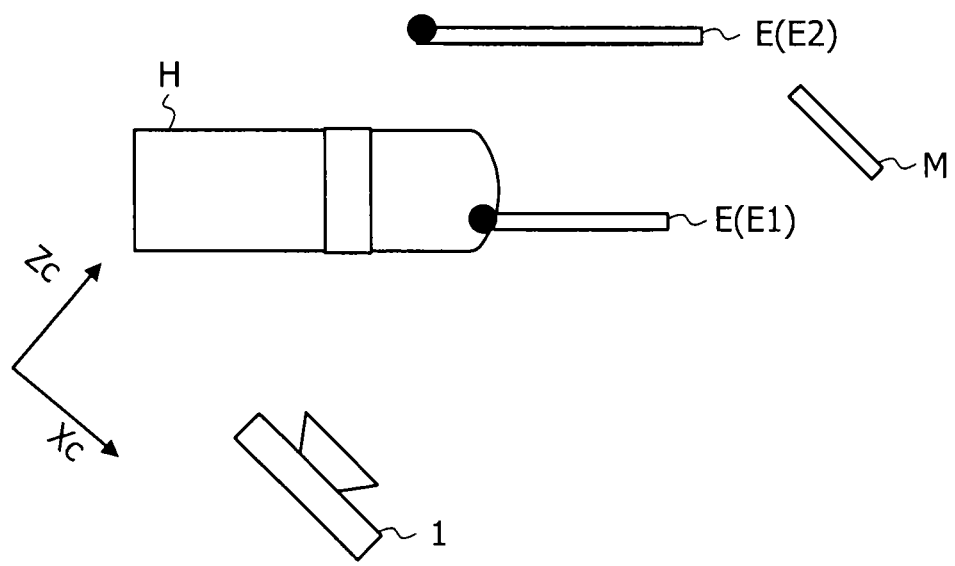
FIG. 8 illustrates an arrangement example of AR object E.

FIG. 8 illustrates an arrangement example of the AR object E. Similar to FIG. 6, FIG. 8 illustrates a positional relationship of a state where the computer 1, the marker M, the object H, and the AR object E are seen from above. The captured image of the display screen S2 exemplified in FIG. 7 is a captured image imaged by the computer 1 disposed at the position illustrated in FIG. 8.

If the position of the AR object E is set at the position of the AR object E (E1) in FIG. 6, as the AR object E (E1) of the display screen S2, the projection image of the AR object E is displayed at the position where the projection image of the AR object E is aligned to the object H. On the other hand, if the position of the AR object E is set at the position of the AR object E (E2) in FIG. 6, as the AR object E (E2) of the display screen S2, the projection image of the AR object E is displayed at the position different from the object H. If the display is performed as the AR object E (E2), since the crack is not present at the position where information of "there is a crack!" is added, the purpose of adding the information of "there is a crack!" may not be fulfilled. Furthermore, it may be misunderstood to the user that the crack is present at the position indicated by the AR object E (E2). That is, the AR object E is set at the position of E2 and thereby omission occurs in the supply of desired information and unnecessary information is supplied.

As described above, even if the position of the projection image of the AR object E is specified while confirming the image of the object H and the projection image of the AR object E displayed in the display screen S1, the position of the AR object E in the Zc direction is not specified. Thus, in the display screen S2 that is imaged from another angle and the like, a situation occurs in which the image of the AR object E displayed at the position where the image of the AR object E is aligned to the object H in the display screen S1, is displayed at the position where the image of the AR object E is not aligned to the object H in the display screen S2.

On the other hand, if a depth of the AR object E is simply numerically specified and the like, work such as measuring occurs for setting the position of the AR object E. Furthermore, if position setting is performed based on visual estimation, it desires trained capabilities of the user.

In the embodiment, a screen where the position of the captured image in the depth direction is capable of being confirmed is used for setting of the position of the AR object E.

Figure 9:
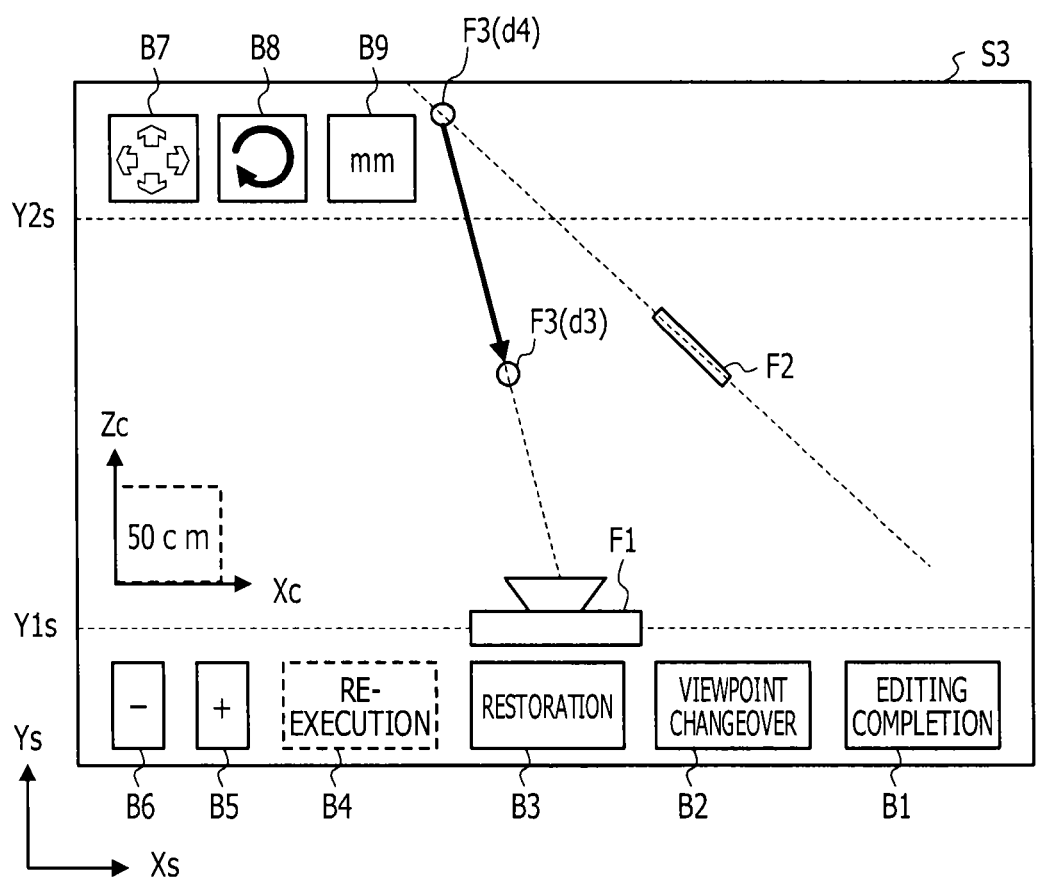
FIG. 9 illustrates an example of an input screen (aerial view model diagram).

FIG. 9 illustrates an example of an input screen (aerial view model diagram). The aerial view model diagram indicated by a display screen S3 includes a figure F1 corresponding to the computer 1 and a figure F2 corresponding to the marker M. Scale display and a menu group B1 to B9 are illustrated in the display screen S3. The menu group B1 to B9 includes an editing completion button B1, a viewpoint changeover button B2, a restoration button B3, a re-execution button B4, an enlargement button B5, a reduction button B6, a scaling moving button B7, a rotation mode button B8, a numerical value specification mode button B9, and the like.

A scale display includes display of the coordinate axes (Xc axis and Yc axis) of a plane illustrated in the aerial view model diagram and a distance (displaying that one side of a square indicated by a dotted line in FIG. 9 is a distance of 50 cm in the camera coordinate system) in the real space corresponding to unit distance within the screen. The editing completion button B1 is a display element that indicates an input position of operation instruction to confirm the setting of the positional coordinate of the AR object E. The viewpoint changeover button B2 is a display element that indicates the input position of operation instruction to changeover the input screen using the aerial view model diagram and the input screen using the captured image. The restoration button B3 is a display element that indicates the input position of an operation instruction to return to a state before an operation immediately before being performed with respect to the display screen S3 (or a display screen when input to the restoration button is obtained). The re-execution button B4 is a display element that is displayed if an operation to the restoration button B3 is performed and indicates the input position of the operation instruction to execute again the restoration operation. The enlargement button B5 is a display element indicating the input position of operation instruction to adjust the scale of the aerial view model diagram and performs enlargement of the aerial view model diagram if an input to the display position of the enlargement button B5 is performed. The reduction button B6 is a display element indicating the input position of operation instruction to adjust the scale of the aerial view model diagram and performs the reduction of the aerial view model diagram if an input to the display position of the reduction button B6 is performed. The scaling moving button B7 is a display element indicating the input position of operation instruction specifying an operation mode and changes over the operation mode to a scale moving mode if an input to the display position of the scaling moving button B7 is performed. The rotation mode button B8 is a display element indicating an input position of operation instruction specifying the operation mode and changes over the operation mode to a rotation mode if an input to the display position of the rotation mode button B8 is performed. The numerical value specification mode button B9 is a display element indicating an input position of operation instruction specifying the operation mode and changes over the operation mode to a numerical value specification mode if an input to the display position of the numerical value specification mode button BY is performed.

In the scale moving mode, the position coordinate of the AR object E and the magnification are adjusted according to the input operation. For example, the scale moving mode is automatically set to the operation mode when starting the position specification of the AR object E. In the rotation mode, the rotary coordinate of the AR object E is adjusted according to the input operation. The rotary coordinate is used when determining the position coordinate of each point configuring the AR object E based on the reference point. In the numerical value specification mode, a numerical value input screen is displayed. The position of the reference point of the AR object, the rotary coordinate, and the magnification are determined by a numerical value which is input into the numerical value input screen.

The figure F1 and the figure F2 are displayed in the aerial view model diagram of the display screen S3 based on the camera (computer 1) and the coordinate of the marker M in the camera coordinate system. For example, the figure F1 is disposed based on the original point Oc of the camera coordinate system. Furthermore, the display position and the orientation of the figure F2 are determined based on the coordinate V1c (X1c, Y1c, Z1c) of the original point Om of the marker coordinate system in the camera coordinate system, and a rotary coordinate U1c (P1c, Q1c, R1c) of the marker coordinate system with respect to the camera coordinate system.

For example, the original point Oc of the camera coordinate system is disposed at a position (X1s, Y1s) in the screen coordinate system (Xs, Ys), the position of the figure F2 is set based on the scale, and thereby the aerial view model diagram is generated. In this case, the figure F1 is disposed at the position (X1s, Y1s). For example, the coordinate X1s is a center of the display screen S3 in an Xs direction, and the coordinate Y1s is a position deviated downward from the center within the display screen S3 by a predetermined amount. Furthermore, the orientation of the computer 1 is displayed by the shape of the figure F1 and the figure F1 within the display screen S3 displays a state where a lens of the camera included in the computer 1 faces an upper part of the screen. Furthermore, the figure F2 is displayed at a position (X2s, Y2s). The coordinate X2s is set according to the coordinate X1c and the scale. The coordinate Y2s is set according to the coordinate Z1c and the scale. If the marker M is positioned away from the camera by setting of the scale, the marker M may not be disposed within the display screen S3. In this case, the user may confirm the aerial view model diagram in which the figure F2 is accommodated in the display screen by reducing the aerial view model diagram using the reduction button B6.

As another aspect, an initial value of the coordinate Y2s is set in advance, the coordinate X1c is adjusted depending on a ratio of a distance (Y2s-Y1s) within the screen between the figure F1 and the figure F2 and the coordinate Z1c, and then the coordinate X2s may be set. That is, the scale is obtained depending on a ratio of a distance (Y2s-Y1s) and the coordinate Z1c.

Furthermore, for example, the figure F2 of the coordinate (X2s, Y2s) is displayed on the display screen S3 in a state of being rotated based on the rotary coordinate U1c (P1c, Q1c, R1c). Furthermore, for example, the figure F2 may be displayed on the display screen S3 in a state of being rotated only based on Q1c.

In a state where the display screen S3 is displayed, if a position within the display screen S3 is specified by an operation of the user, setting of the position coordinate of the AR object is performed based on the specification. For example, the display screen S3 is displayed on a screen of a touch screen and the position within the display screen S3 is specified according to an input of the user on the touch screen.

According to the aerial view model diagram of the display screen S3, the user may confirm the positional relationship between the computer 1 and the marker M of the camera coordinate system in the Zc direction (depth direction). If the display screen S3 is supplied, the user may estimate the positions of the AR object E with respect to the computer 1 and the marker M displayed within the display screen S3 based on the positional relationship between the computer 1, the marker M, and the object H in the real space.

For example, if a position d3 (X3s, Y3s) within the display screen S3 is specified, a depth Z2c of the AR object E is determined based on a difference between the coordinate Y3s and the coordinate Y1s, and a scale thereof. Furthermore, a figure F3 (d3) corresponding to the AR object E is displayed at the specified position. For the figure F3, an arbitrary shape may be used or the projection image of the AR object may be used.

Figure 10:
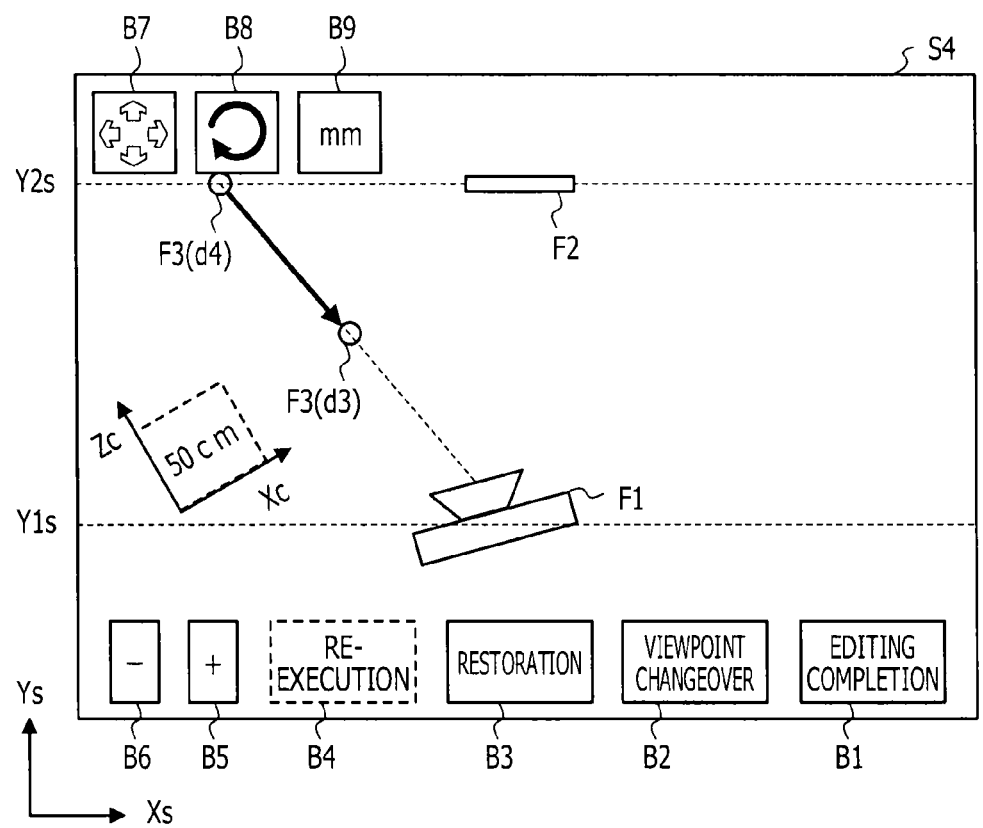
FIG. 10 illustrates an example of an input screen (aerial view model diagram).

FIG. 10 illustrates an example of an input screen (aerial view model diagram). Similar to the aerial view model diagram of the display screen S3, the aerial view model diagram of a display screen S4 illustrated in FIG. 10 includes the figure F1 corresponding to the computer 1 and the figure F2 corresponding to the marker M. Furthermore, the scale display and the menu group B1 to B9 are indicated on the display screen S4.

The figure F2 is fixed to a position (X2s, Y2s) in the aerial view model diagram of the display screen S4. For example, the coordinate X2s indicates a center of the display screen S4 and the coordinate Y2s is a position deviated upward from the center within the display screen S3 by a predetermined amount. In the figure F1, the display position (X1s, Y1s) and the orientation is determined based on the coordinate V1c (X1c, Y1c, Z1c) of the original point Om of the marker coordinate system in the camera coordinate system and the rotary coordinate G1c (P1c, Q1c, R1c) of the marker coordinate system with respect to the camera coordinate system.

If the display screen S4 is supplied, the user may consider the positional relationship between the computer 1 and the marker M in the real space and the positional relationship between the figure F1 and the figure F2 within the display screen S4 including depth direction. Thus, the user may estimate the position specification of the AR object E including the depth within the display screen S4 based on the positional relationship between the computer 1 and the marker M in the real space.

Figure 11:
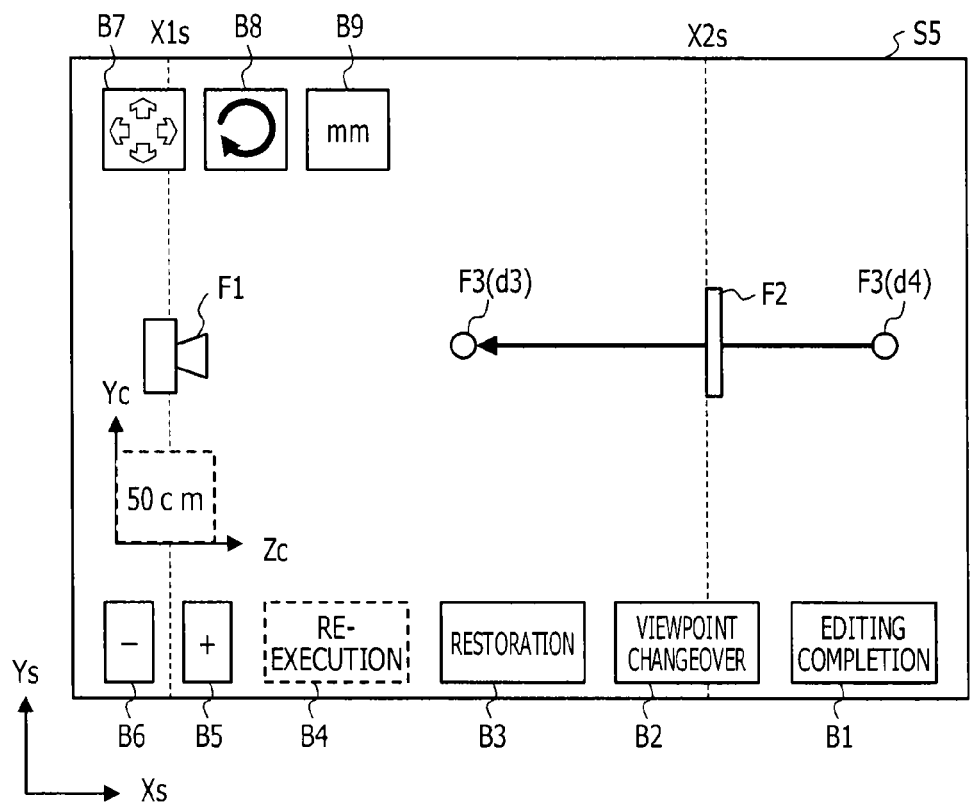
FIG. 11 illustrates an example of an input screen (plan view of Zc-Yc plane).

FIG. 11 illustrates an example of an input screen (plan view of Zc-Yc plane). Similar to the aerial view model diagram of the display screen S3, an aerial view model diagram of a display screen S5 illustrated in FIG. 11 includes the figure F1 corresponding to the computer 1 and the figure F2 corresponding to the marker M. Furthermore, the scale display and the menu group B1 to B9 are indicated on the display screen S5.

The aerial view model diagram of the display screen S5 illustrates a positional relationship between the computer 1, the marker M, and the AR object E within the two-dimensional space by the Yc axis and the Zc axis of the camera coordinate system. Also in the display screen S5, the user may consider the positional relationship between the computer 1 and the marker M in the real space and the positional relationship between the figure F1 and the figure F2 within the display screen S5 including depth direction. Thus, the user may estimate the position specification of the AR object E including the depth within the display screen S5 based on the positional relationship between the computer 1 and the marker M in the real space.

When displaying the input screen of the display screens S3 to S5 for the first time, an initial position d4 of the figure corresponding to the AR object is set within the aerial view model diagram. However, since the coordinate Z2c of the camera coordinate system in the depth direction is not determined by the position specification using the captured image, for example, the coordinate Z2c is initially set to arbitrarily value. The initial value of the coordinate Z2c may be, for example, the coordinate Z1c of the marker M. Furthermore, a point on a plane (plane of (Xm, Ym, 0) in the marker coordinate system) including the marker M may be the initial value. For example, for the projection image indicating the position of the AR object E or the figure F3, the position within the screen is adjusted by a drag operation and the like. Otherwise, the position of the figure F3 within the screen is indicated by moving the figure F3 to a position within the screen that is tapped. The figure F3 displayed at a position d4 may be moved to a position d3 by the drag operation or the figure F3 displayed at the position d4 may be moved to the position d3 according to the specification (for example, a tap operation) of the position d3.

According to the display screens S3 to S5, a reference of the position specification including the depth direction is supplied for the AR object E. Furthermore, the position specification including the depth direction is performed by an input of the user who supplies the reference. If the user performs an input to the viewpoint changeover button B2, the computer 1 changes over the screen from the input screen using the aerial view model diagram to the input screen using the captured image.

Figure 12:
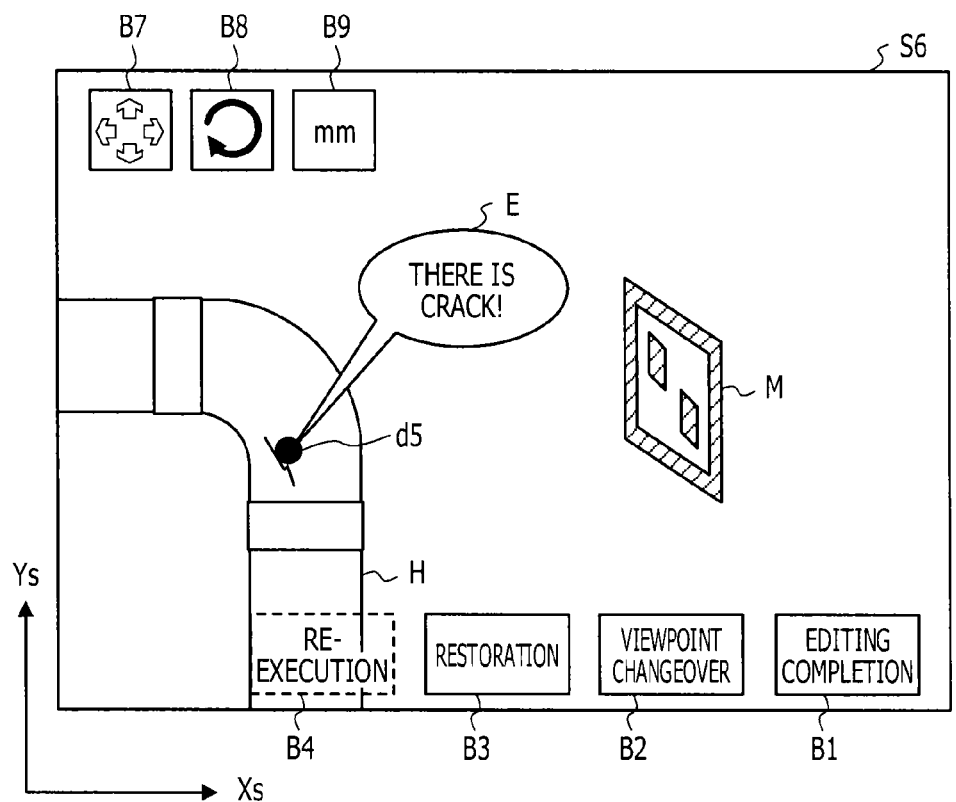
FIG. 12 illustrates an example of an input screen (captured image).

FIG. 12 illustrates an example of an input screen (captured image). The captured image of a display screen S6 illustrated in FIG. 12 includes the marker M and the object H. Furthermore, the projection image of the AR object E, and the menu group of B1 to B4, and menu group of B7 to BY are indicated on the display screen S6.

The position specification to the display screen S6 is performed by an input of the user within the display screen S6. The coordinate of the AR object E is calculated based on a specified position d5 (X5s, Y5s) within the screen. Inverse conversion of the perspective conversion described above is performed with respect to d5 (X5s, Y5s) and thereby the coordinate X2c and the coordinate Y2c of the AR object E of the camera coordinate system are calculated. The coordinates of the AR object E is updated to the calculated coordinates X2c and Y2c.

Furthermore, if an input of the user is performed to the viewpoint changeover button B2, the computer 1 changes over again the screen from the input screen using the captured image to the input screen using the aerial view model diagram. Both the position specification in the input screen using the captured image and the position specification in the input screen using the aerial view model diagram may be performed, and the coordinate (X2c, Y2c, Z2c) of the AR object E of the camera coordinate system is determined when the input of the user is performed to the editing completion button B1.

As described above, the three-dimensional position of the AR object E is specified by performing the position specification using both the input screen (the display screen S6 and the like) using the captured image and the display screen (the display screens S3 to S5 and the like) using the aerial view model diagram. If both the display screens using the captured image and the display screen using the aerial view model diagram are supplied, the user may adjust the position of the AR object while three-dimensionally confirming the position thereof. Thus, the AR object is set in a state of being aligned to the object to which the AR object is added.

If the coordinate of the AR object E of the camera coordinate system is determined, the position coordinate (the camera coordinate system) of each point of the AR object E is converted to the coordinate of the marker coordinate system by inverse conversion of the model-view conversion described above. The coordinate of each point of the AR object E that is converted is registered in association with the marker ID of the marker M. Adjustment may be performed with respect to the registered AR object E based on the captured image that is imaged again at a different angle of view. For example, if setting of the coordinate of each point of the AR object E is performed in the input screen based on the captured image of the display screen S1, setting may be further performed in the input screen (aerial view model diagram and the captured image) based on the captured image of the display screen S2.

Hereinafter, a configuration and an operation of the computer 1 executing the position specification of the AR object E using the display screen (aerial view model diagram and the captured image) described above, and the like will be described.

Figure 13:
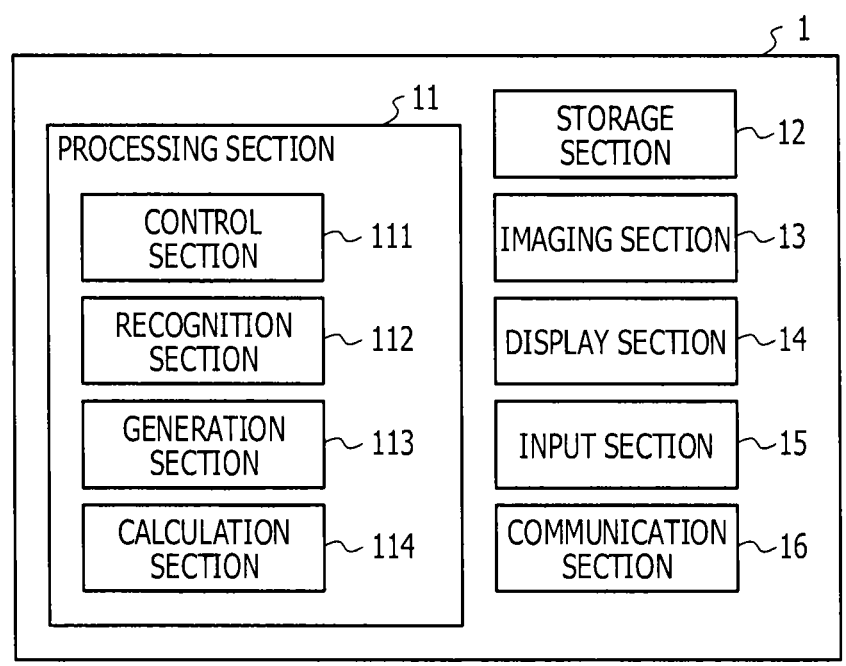
FIG. 13 illustrates an example of functional configurations of computer 1.

FIG. 13 illustrates an example of functional configurations of the computer 1. The computer 1 includes a processing section 11, a storage section 12, an imaging section 13, a display section 14, an input section 15, and a communication section 16. The processing section 11 includes a control section 111, a recognition section 112, a generation section 113, and a calculation section 114.

The processing section 11 executes a process of the position specification of the object E. Furthermore, the processing section 11 performs control of the storage section 12, the imaging section 13, the display section 14, the input section 15, and the communication section 16 in the execution of the process. The storage section 12 stores information that is used in other functional blocks. For example, the storage section 12 stores a marker management table T1, an edition table T4, a definition table T2, a management table T3, and the like described below. The imaging section 13 performs an imaging process. The captured image that is obtained by the imaging process of the imaging section 13 is stored in the storage section 12. The display section 14 performs display of the image according to the control of the processing section 11. The input section 15 performs detection of an operation of an operator of the computer 1 and transmits a signal corresponding to the detection to the processing section 11. The communication section 16 performs data communication with another device according to instruction of the processing section 11.

The control section 111 performs control of each functional block according to information obtained from the input section 15 or the communication section 16, or a processing result of the recognition section 112, the generation section 113, and the calculation section 114. The recognition section 112 recognizes the image of the marker M from the captured image and calculates the coordinate (camera coordinate system) of the marker M with respect to the computer 1 from the recognized image. Furthermore, the recognition section 112 reads the marker ID based on the image of the marker M. The control section 111 stores a recognition result (coordinate, the marker ID, and the like) of the marker M by the recognition section 112 in the storage section 12. The generation section 113 generates the image displayed on the display section 14. For example, the generation section 113 generates the projection image of the AR object and synthesizes the generated projection image to the captured image obtained by the imaging section 13.

Furthermore, for example, the generation section 113 generates the figures corresponding to the computer 1, the marker M, and the AR object, and generates the aerial view model diagram in which the generated figures are disposed. The calculation section 114 calculates a setting value of the AR object E based on information of the marker management table T1, information obtained from the input section 15 or the communication section 16, definition of the AR object E, and the like. The control section 111 stores the setting value obtained by the calculation in the management table T3.

FIGS. 14 to 17 illustrate a data structure of data used for coordinate setting of the AR object E.

FIG. 14 illustrates the marker management table T1. If the image captured by the imaging section 13 includes the image of the marker M, the recognition section 112 stores the recognition result obtained from the image of the marker M in the marker management table T1. The marker management table T1 includes information such as the marker ID, the coordinates (Xc, Yc, Zc, Pc, Qc, Rc) in the camera coordinate system, and an object additional flag for each marker that is recognized by the recognition section 112. According to information stored in the marker management table T1, in the embodiment, the marker ID of the marker M is "100", the position coordinate is (X1c, Y1c, Z1c), and the rotary coordinate is (P1c, Q1c, R1c). The object additional flag is a flag indicating the marker with which the AR object where a position specifying process is performed is associated. For example, information stored in the marker management table T1 is updated whenever the captured image is obtained.

FIG. 15 illustrates the definition table T2. Definition information of the AR template is indicated in the definition table T2. The deflection information of the AR template includes identification information (template ID) of the AR template, coordinate information T21 of each top point configuring the AR template, and configuration information T22 (specifying order of the top points and a texture ID) of each surface configuring the AR template. The order of the top points indicates the order of the top points configuring the surface. The texture ID indicates the identification information of the texture that is mapped on the surface. A reference point of the AR template is, for example, a 0th top point. A shape and a pattern of a three-dimensional model are determined by information indicated in the definition table T2.

FIG. 16 illustrates the management table T3. The management table T3 indicates setting information of the AR object E that is set by using the AR template. The management table T3 stores an object ID of the AR object E, the position coordinate (Xm, Ym, Zm) of the reference point in the marker coordinate system, the rotary coordinate (Pm, Qm, Rm) in the marker coordinate system, the magnification D (Jx, Jy, Jz) where the AR template is the reference, the template ID of the AR template, the marker ID, and additional information. The coordinate stored in the management table T3 is a coordinate in the marker coordinate system where the marker indicated in the marker ID stored in the same record is reference. In the AR object E, the AR template illustrated in FIG. 15 is adjusted based on setting information (position, the orientation, and the size) of the management table T3. That is, specification of the position, the orientation, and the size of the AR object E is performed by setting information managed in the management table T3.

Additional information is information added to the AR object E. As additional information, access information to a text, a Web page, or a file, and the like are used.

For example, the AR object E where the object ID illustrated in FIG. 16 is "1000" is configured of each top point obtained by the coordinate of each top point defined in the AR template "10" being one time each of the directions Xm, Ym, Zm, being rotated at the rotary coordinate (0, 0, 0), and being translated according to position coordinates (121.5, 510.0, 860.5). Furthermore, the AR object E performs mapping of additional information on a surface configuring the AR object E.

FIG. 17 illustrates the edition table T4. If the AR object E of the object on which the position specification is performed is determined and the object ID is specified, the edition table T4 is provided in the storage section 12. The edition table T4 includes the object ID, the template ID, the position coordinate (the marker coordinate system) of the reference point, the rotary coordinate (the marker coordinate system), the magnification D, the position coordinate (the camera coordinate system) of the reference point, the rotary coordinate (the camera coordinate system), and a flag α for the AR object E. The flag α indicates changeover of input screen of the position specification. For example, the flag α is "1" if the input screen is displayed based on the aerial view model diagram and is "0" if the input screen is displayed based on the captured image.

If the object ID is specified, information regarding the specified object ID within the management table T3 is stored in the edition table (management information T41). The management information T41 includes the position coordinate, the rotary coordinate, and the magnification of the AR object E in the marker coordinate system. Edition information T42 is generated using information of the marker management table T1 based on the management information T41. The edition information T42 includes the position coordinate, the rotary coordinate, and the magnification Dx of the AR object E in the camera coordinate system. In the position specification of the AR object E, update is performed with respect to the edition information T42 until the position is determined. If the position of the AR object E is determined, the management information T41 is calculated by the calculation section 114 based on the edition information T42 and contents of the management information T41 are reflected in the management table T3.

Figure 18:
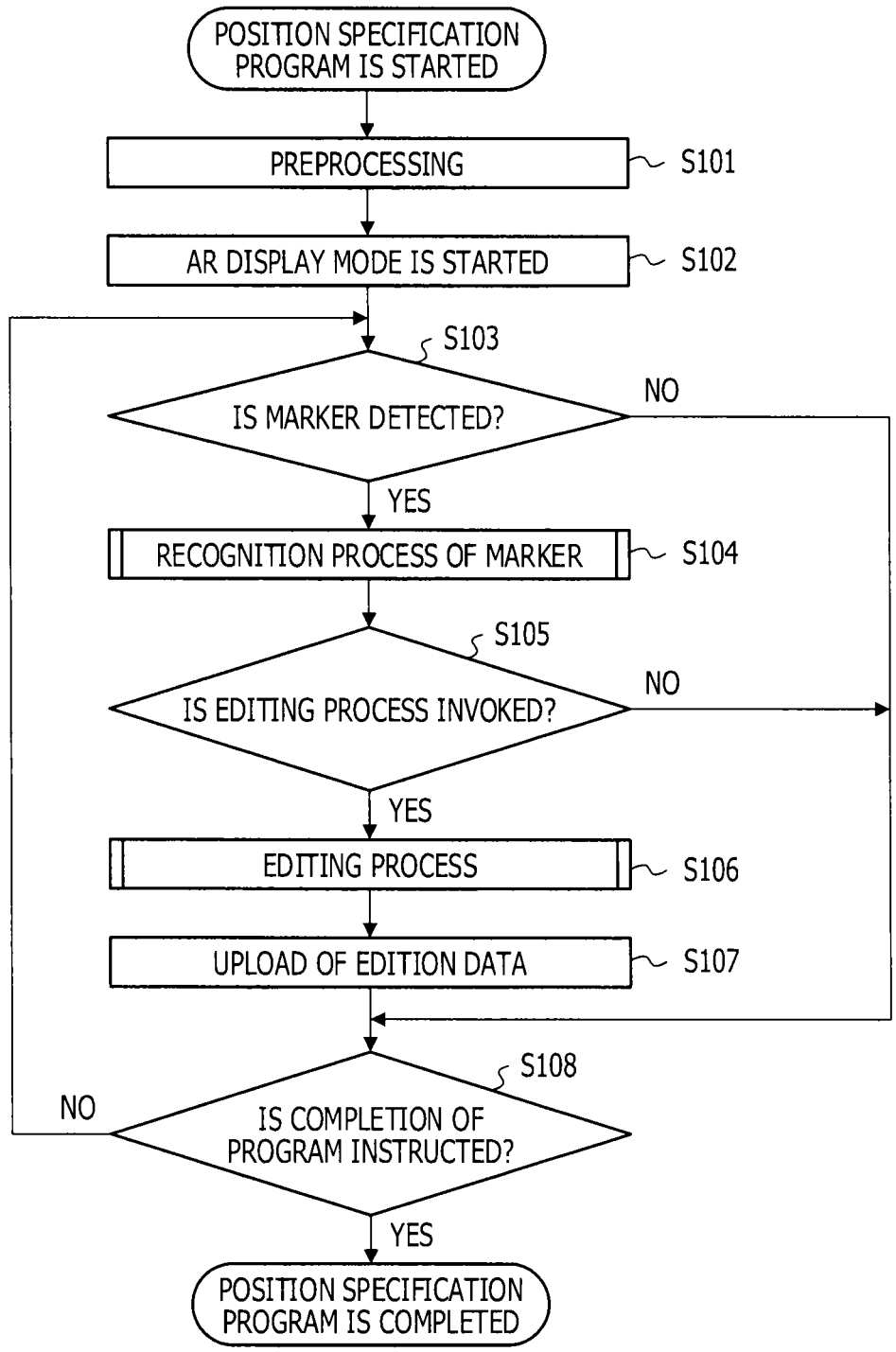
FIG. 18 illustrates an example of a processing procedure of a position specification program.

FIG. 18 illustrates an example of a processing procedure of a position specification program. The position specification program is a program in which the position specifying process executed by the processing section 11 is defined. If the position specification program is started, the control section 111 performs preprocessing of the position specification (S101). In the process of S101, the definition table T2 or the management table T3, and the like are read, and storage regions of the marker management table T1, the edition table T4, and the like are secured.

If preprocessing of S101 is performed, the control section 111 performs starting instruction of the AR display mode (S102). In S102, for example, the control section 111 allows the imaging section 13 to start imaging at predetermined time intervals and the recognition section 112 to start a marker detection process for the captured image. Furthermore, the control section 111 allows the display section 14 to display the image imaged by the imaging section 13.

If imaging is instructed by the control section 111, the imaging section 13 obtains the image generated by the imaging device at predetermined time intervals and stores the obtained image in the storage section 12. The storage section 12 is provided with a buffer storing a plurality of sheets of image and the image imaged by the imaging section 13 is stored in the buffer. For example, the buffer provided in the storage section 12 is a display buffer in which the image displayed by the display section 14 is stored. The images stored in the display buffer are sequentially displayed in the display section 14.

The recognition section 112 obtains the image stored in the buffer provided in the storage section 12 and determines whether or not the image of the marker M is included in the obtained image. The recognition section 112 may perform a detection process for the image of one sheet of a predetermined sheets stored in the buffer.

A determination reference whether or not the image of the marker M is included in the image is determined depending on the shape and the pattern of the marker. The marker M illustrated in FIG. 1 is the squire and has a pattern including a black edge. Thus, for example, whether or not the marker M is included in the image is determined depending on whether or not a frame-shaped rectangular region is present within the image with brightness being less than a predetermined value.

Furthermore, the recognition section 112 performs reading of the marker ID of the marker M. For example, reading of the marker ID is performed based on information of the brightness within the rectangular frame. For example, for each region that is obtained by dividing the rectangular frame, a region in which the brightness is the predetermined value or more is "1", a region in which the brightness is less than the predetermined value is "0", it is determined whether each region is "1" or "0" in the predetermined order, and a column of information obtained by the determination is the marker ID. Furthermore, for example, arrangement of the region in which the brightness is the predetermined value or more and the region in which the brightness is less than the predetermined value within the rectangular frame is patterned, and the marker ID corresponding to the pattern may be used. Furthermore, if a numeral value range designated to the marker ID is predetermined and the read marker ID is not within the numerical value range, it may be determined that the marker ID may not be read. The recognition section 112 stores the read marker ID in the marker management table T1 stored in the storage section 12. Furthermore, the recognition section 112 notifies the control section 111 of the position coordinate (screen coordinate system) of the image of the marker M.

The recognition section 112 notifies the control section 111 of the determination result whether or not the image of the marker M is included the obtained image. The control section 111 determines whether or not the marker M is detected based on a notification result from the recognition section 112 (S103). Otherwise, the control section 111 detects that the marker ID is stored in the marker management table T1 by the recognition section 112 and may determine that the marker M is detected without performing notification to the control section 111 by the recognition section 112. If the marker M is detected (S103: YES), the control section 111 executes a recognition process of the marker (S104). If the marker M is not detected (S103: NO), the control section 111 determines whether or not completion of the program is instructed (S108). If the completion is not instructed (S108: NO), the control section 111 performs determination (S103) whether or not the maker is detected.

Figure 19:
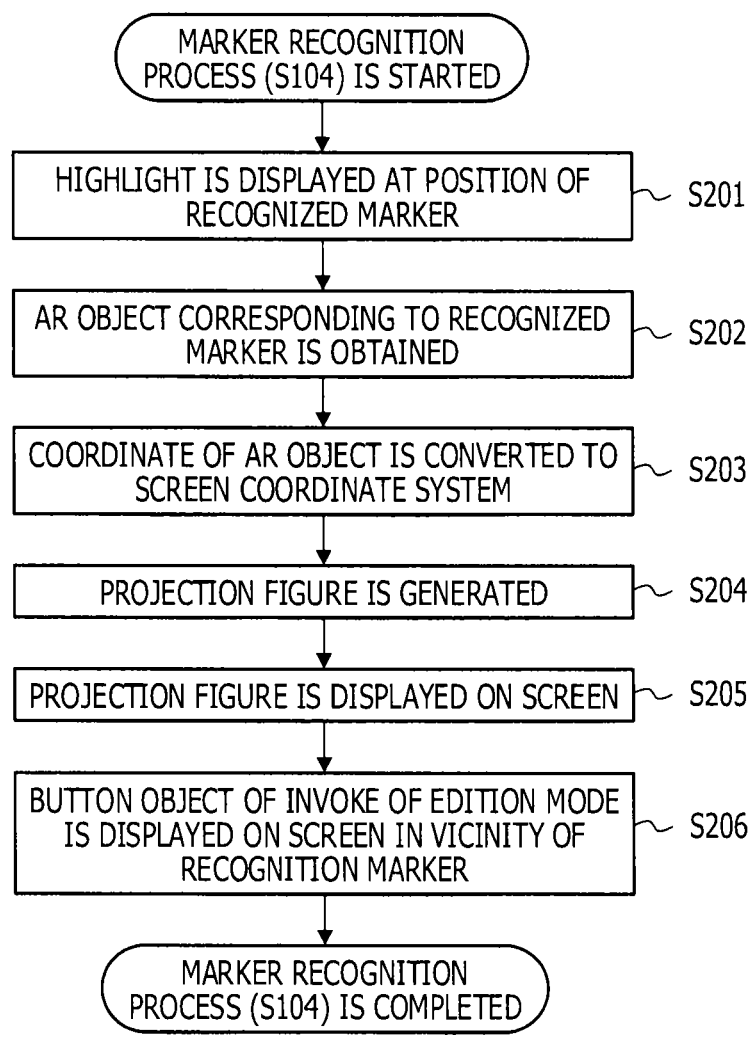
FIG. 19 illustrates an example of a processing procedure of a marker recognition process.

FIG. 19 illustrates an example of a processing procedure of a marker recognition process. If the marker recognition process is started, the control section 111 performs highlighting (highlight display) indicating the presence of the marker at a position in which the recognized marker M is displayed within the display screen of the display section 14 (S201). For example, highlighting is performed by displaying the rectangular frame at the display position of the marker M and the like, and it serves to notify the user of detection of the marker M. The control section 111 notifies the generation section 113 of the position coordinate (screen coordinate system) of the marker M. The generation section 113 synthesizes the image (image within the buffer for display) displayed in the display section 14 to a highlighting figure at a position according to notification from the control section 111. The highlighting figure is, for example, a display element such as a rectangular red frame.

If the process of S201 is performed, the control section 111 allows the recognition section 112 to calculate the position and the rotary coordinate of the marker M (S202). If instruction is received from the control section 111, the recognition section 112 calculates the position and the rotary coordinate (camera coordinate system) of the marker M based on the image of the marker M detected in S103. For example, the position and the rotary coordinate (camera coordinate system) of the marker M are calculated based on the shape of the image of the marker M and the position within the image. The calculated position and the rotary coordinate (camera coordinate system) are stored in the marker management table T1.

If the process of S202 is performed, the control section 111 performs a display process of the AR object in association with the marker registered in the marker management table T1 (S203 to S205). The display process of S203 to S205 is an additional procedure. Furthermore, if the AR object in association with the marker registered in the marker management table T1 is not present, the display process of the AR object is not executed.

The control section 111 searches that the marker ID of each marker registered in the marker management table T1 is included in data of the AR object registered in the management table T3. If the AR object is present, the control section 111 obtains the data of the AR object from the management table and the definition table corresponding to the template ID included in the obtained data is read (S203). The control section 111 allows the generation section 113 to generate the projection image for each AR object obtaining the data in S203 (S204).

In S204, the generation section 113 allows the calculation section 114 to execute the model-view conversion from the marker coordinate system to the camera coordinate system for each coordinate included in the obtained definition table and to execute the perspective conversion from the camera coordinate system to the screen coordinate system. The conversion matrix M used for the model-view conversion is obtained based on position and the rotary coordinate (camera coordinate system) of the marker coordinate system stored in the marker management table T1. If the calculation section 114 performs the coordinate conversion, the generation section 113 further generates an element figure (surface element) corresponding to each surface that is configured by combining points based on each point coordinate obtained by the coordinate conversion. Each surface element defined in the definition table T2 is generated by synthesizing the defined texture in a region surrounded by each point configuring the surface element. Furthermore, the generation section 113 generates a projection figure corresponding to the AR object by synthesizing the surface elements for the same AR object. In the synthesis of the surface elements, the texture of each surface element may be corrected (surface element that is hidden by another surface element is not displayed) depending on a context between the generated surface elements.

If the projection image is generated for each AR object, the control section 111 allows the generation section 113 to synthesize the generated image to the captured image within the buffer for display (S205). An image that is obtained by synthesizing the projection image of the AR object to the captured image imaged by the imaging section 13 is displayed in the display section 14 by the process of S205.

If the process of S205 is performed, the control section 111 allows the display section 14 to display the edition starting button (S206). If the process of S206 is performed, the control section 111 completes the marker recognition process illustrated in FIG. 19 and returns to the flowchart of the position specifying process illustrated in FIG. 18.

Subsequently, the control section 111 performs determination whether or not an input to the edition starting button is detected within a predetermined time after the edition starting button is displayed in S206 (S105). If the input to the edition starting button is detected (S105: YES), the control section 111 performs an editing process illustrated in FIG. 20 (S106). If the input to the edition starting button is not detected within a predetermined time (S105: NO), the control section 111 determines whether or not the completion of the program is instructed (S108).

Figure 20:
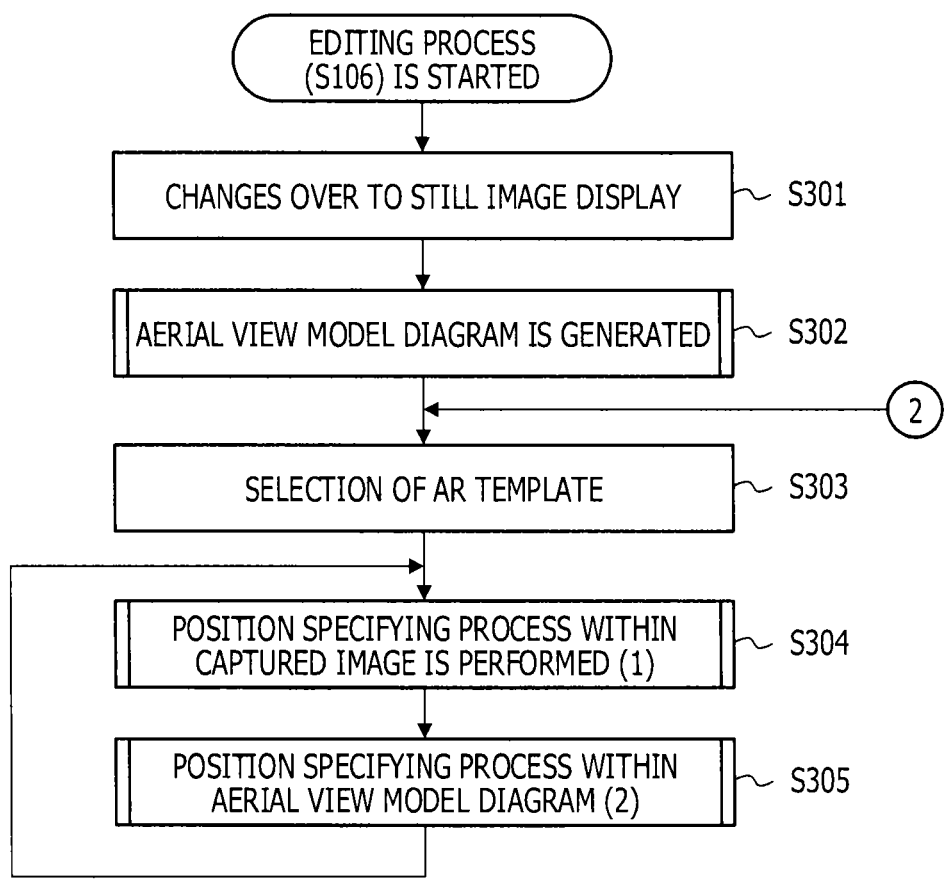
FIG. 20 illustrates an example of a processing procedure of an editing process.

FIG. 20 illustrates an example of a processing procedure of the editing process. If the editing process is started, the control section 111 changes over the display by the display section 14 to still image display (S301). For example, if a plurality of markers are recognized within the captured image, any one (marker M) of the plurality of markers is selected by the operation of the user in S301. When receiving information selecting the marker M from the input section 15, the control section 111 turns ON the object additional flag of the marker management table T1 for the selected marker M.

If the process of S301 is performed, the control section 111 allows the generation section 113 to generate the aerial view model diagram (S302).

Figure 21:
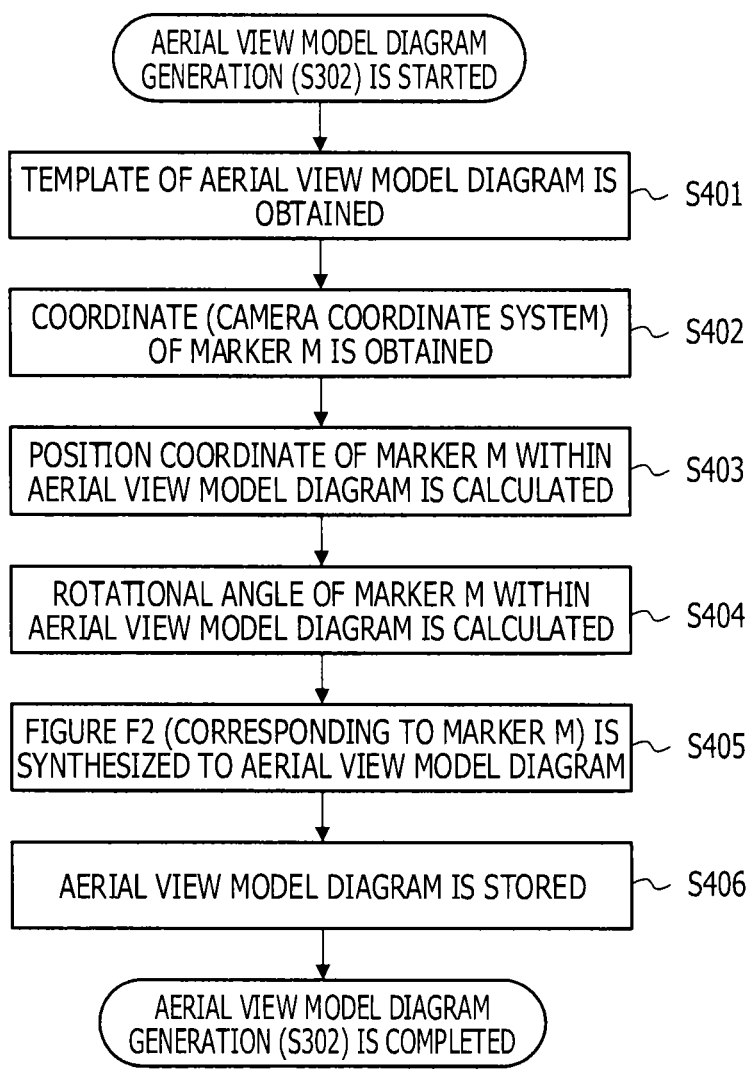
FIG. 21 illustrates an example of a processing procedure of a generation of aerial view model diagram.

FIG. 21 illustrates an example of a processing procedure of generation of the aerial view model diagram. If the generation process of the aerial view model diagram is started, the generation section 113 obtains the template of the aerial view model diagram stored in the storage section 12 (S401). The template of the aerial view model diagram is an image of a size matching the display screen of the display section 14 and, for example, the figure F1 is indicated in a predetermined position (X1s, Y1s). That is, the figure F1 is indicated as the display screen S3 of FIG. 9. As the display screen S3 of FIG. 9, the template of the aerial view model diagram may include the menu group B1 to B9 and the like.

If the process of S401 is performed, the generation section 113 obtains the position and the rotary coordinate (camera coordinate system) for the selected marker M from the marker management table (S402). Furthermore, the generation section 113 allows the calculation section 114 to calculate the position coordinate (the screen coordinate system) of the marker M (S403). As described using the display screen S3 illustrated in FIG. 9, the calculation section 114 calculates the position (X2s, Y2s) of the marker M based on the scale of the aerial view model diagram, the coordinates X1c, and Z1c of the marker M in the camera coordinate system. For example, the scale is set to be a predetermined initial value. Furthermore, the generation section 113 allows the calculation section 114 to calculate the rotational angle (screen coordinate system) of the marker M (S404). As described using the display screen S3 illustrated in FIG. 9, the calculated rotational angle may be calculated based on the rotary coordinates (P1c, Q1c, R1c) of the marker M or may be calculated based on only the rotary coordinate Q1c.

The generation section 113 synthesizes the template of the aerial view model diagram to the figure F2 based on the calculation result of S403 and S404 (S405). The control section 111 stores the aerial view model diagram obtained by synthesizing of S405 in the generation section 113 in the storage section 12 (S406). If the process of S406 is performed, the control section 111 returns to the processing procedure of FIG. 20.

If the generation process (S302) of the aerial view model diagram is performed, the control section 111 executes the selection process of the AR template (S303). In S303, for example, the control section 111 allows the display section 14 to display an AR template menu illustrated in FIG. 25 and determines whether any one template within the AR template menu is selected according to an input by the user received from the input section 15. The control section 111 generates the object ID and stores the template ID and the object ID of the selected AR template in the management table T3. Predetermined initial values are stored for other items (position, the rotary coordinate, and the size) within the management table T3. Furthermore, the control section 111 stores information stored in the management table T3 in the edition table T4. Furthermore, the control section 111 allows the calculation section 114 to calculate the edition information T42 based on the management information T41 stored in the edition table T4 and stores the edition information T42 in the edition table T4.

Otherwise, in S303, for example, the control section 111 determines which AR object displayed by S203 to S205 is selected according to the input by the user received from the input section 15. In this case, the control section 111 stores information within the management table of the selected AR object in the edition table T4. Furthermore, the control section 111 allows the calculation section 114 to calculate the edition information T42 based on the management information T41 stored in the edition table T4 and stores the edition information T42 in the edition table T4.

The AR object of which the information is stored in the edition table T4 is the AR object (AR object E) that is an object to be position specified. If the AR object E is selected, the control section 111 executes the position specifying process for the selected AR object E (S304 and S305).

Figure 22:
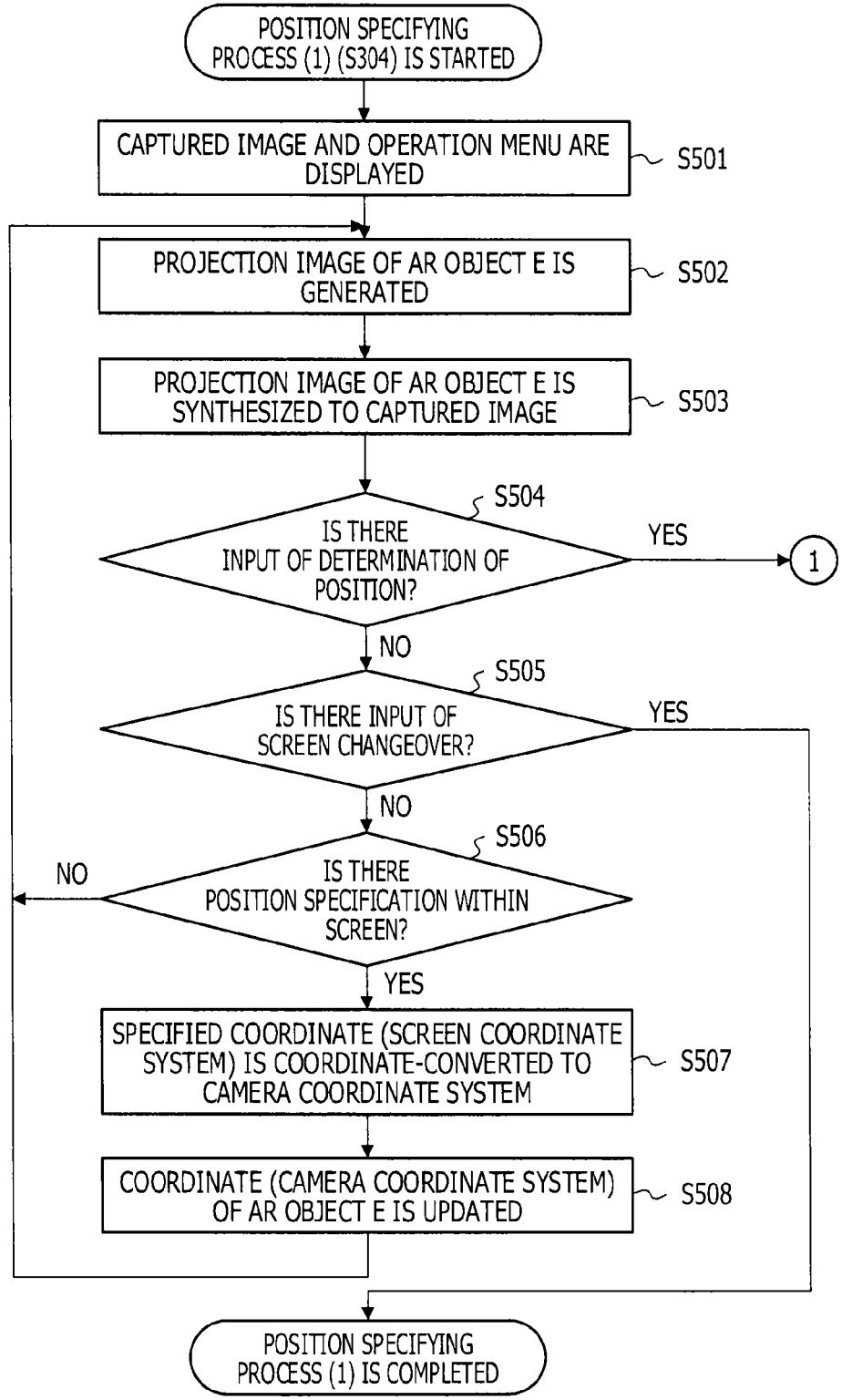
FIG. 22 illustrates an example of a processing procedure of a position specifying process based on captured image.

FIG. 22 illustrates an example of a processing procedure of the position specifying process based on the captured image. If the position specifying process (S304) is started based on the captured image, the control section 111 allows the display section 14 to display the captured image and the menu group B1 to B9 (S501). Furthermore, the control section 111 sets the flag α of the edition table T4 to be "0". Subsequently, the control section 111 allows the generation section 113 to generate the projection image of the selected AR object E (S502). Furthermore, the control section 111 allows the generation section 113 to synthesize the generated projection image to the captured image stored in the buffer for display and displays the synthesized image in the display section 14 (S503). The process of S502 and S503 is performed by the same procedure as that of S203 to S205 illustrated in FIG. 19.

Subsequently, the control section 111 determines whether or not an input of determination of the position from the input section 15 is received (S504). If the input of the determination of the position is not received (S504: NO), the control section 111 determines whether or not an input of viewpoint changeover is received from the input section 15 (S505). If the input of the viewpoint changeover is not received (S505: NO), the control section 111 determines whether or not the position specification within the screen is received from the input section 15 (S506).

The input from the input section 15 using the determination process of S504 to S506 is, for example, the position coordinate (screen coordinate system) in the display screen of the display section 14. The control section 111 performs the determination of S504 and S505 based on the position coordinate received from the input section 15 and the positions of the editing completion button B1 and the viewpoint changeover button B2 displayed in the display screen.

If the position specification within the screen is received from the input section 15 (S506: YES), the control section 111 allows the calculation section 114 to convert the specified position coordinate (screen coordinate system) to the camera coordinate system (S507). As described above, in the coordinate conversion, for example, the coordinate Z1c is used for the coordinate Z2c of the camera coordinate system. The control section 111 updates the coordinate stored in the edition table T4 based on the coordinate of the camera coordinate system calculated in S507 (S508). Updating of S508 is performed based on the flag α and, for example, when the flag α is "0", updating of X2c and Y2c is performed. If the updating process of S508 is performed, the control section 111 returns to the process of S502.

In S504, if an input of position determination is received (S504: YES), the control section 111 executes a process of S306 illustrated in FIG. 24.

In S505, if an input of viewpoint changeover is received (S505: YES), the control section 111 completes the position specifying process (S304) based on the captured image.

Figure 23:
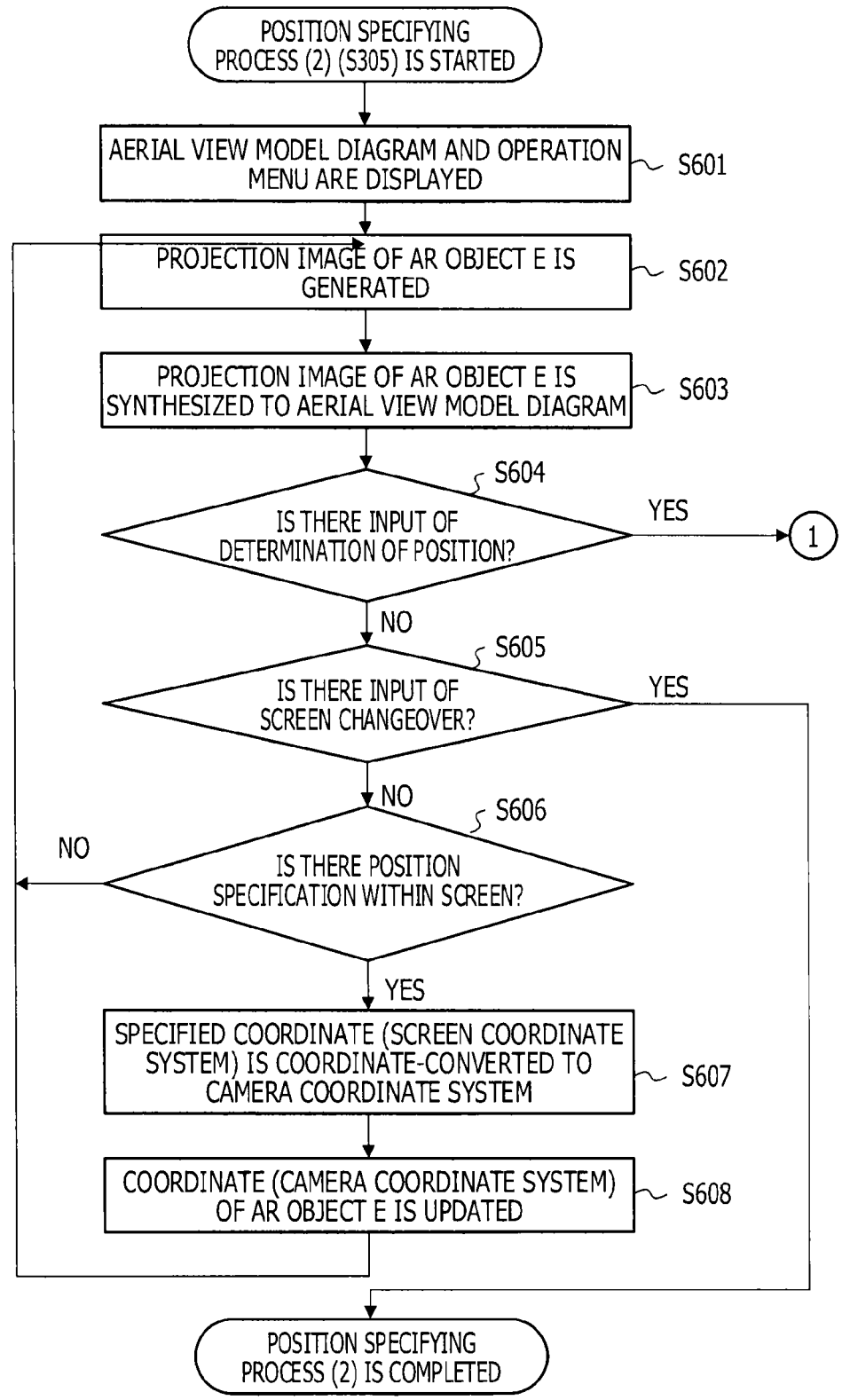
FIG. 23 illustrates an example of a processing procedure of a position specifying process based on an aerial view model diagram.

FIG. 23 illustrates an example of a processing procedure of the position specifying process based on the aerial view model diagram. If the position specification (S305) is started based on the aerial view model diagram, the control section 111 displays the aerial view model diagram and the menu group B1 to B9 stored in the storage section 12 in the display section 14 (S601). Furthermore, the control section 111 sets the flag α of the edition table T4 to be "1". Subsequently, the control section 111 allows the generation section 113 to generate the figure F3 corresponding to the selected AR object E (S602). Furthermore, the control section 111 allows the generation section 113 to synthesize the generated figure F3 to the aerial view model diagram stored in the storage section 12 and displays the synthesized image in the display section 14 (S603). The aerial view model diagram stored in the storage section 12 is the aerial view model diagram generated by the process of S302. In the process of S304, updating to the aerial view model diagram in which the arrangement of the figures is adjusted is appropriately performed according to the input to the enlargement button B5 or the reduction button B6.

Subsequently, the control section 111 determines whether or not the input of the position determination from the input section 15 is received (S604). If the input of the position determination is not received (S604: NO), the control section 111 determines whether or not the input of viewpoint changeover is received from the input section 15 (S605). If the input of viewpoint changeover is not received (S605: NO), the control section 111 determines whether or not the position specification within the screen is received from the input section 15 (S606).

Similar to the process of S504 to S506, an input from the input section 15 using for the determination process of S604 to S606 is, for example, the position coordinate (screen coordinate system) in the display screen of the display section 14. The control section 111 performs determination of S604 and S605 based on the position coordinate received from the input section 15 and the positions of the editing completion button B1 and the viewpoint changeover button B2 displayed in the display screen.

If the position specification within the screen is received from the input section 15 (S606: YES), the control section 111 converts the position coordinate (screen coordinate system) of the figure F3 to the camera coordinate system (S607). The control section 111 updates the coordinate stored in the edition table T4 based on the coordinate that is calculated in S607 (S608). Updating of S608 is performed based on the flag α and, for example, when the flag α is "1", updating of X2c and Z2c is performed. If the updating process of S608 is performed, the control section 111 returns to the process of S602.

In S604, if the input of the position determination is received (S604: YES), the control section 111 executes a process of S306 illustrated in FIG. 24.

In S605, if the input of viewpoint changeover is received (S605: YES), the control section 111 completes the position specifying process (S305) based on the aerial view model diagram. If the process of S305 is completed, the control section 111 executes the position specifying process (S304) based on the captured image.

Figure 24:
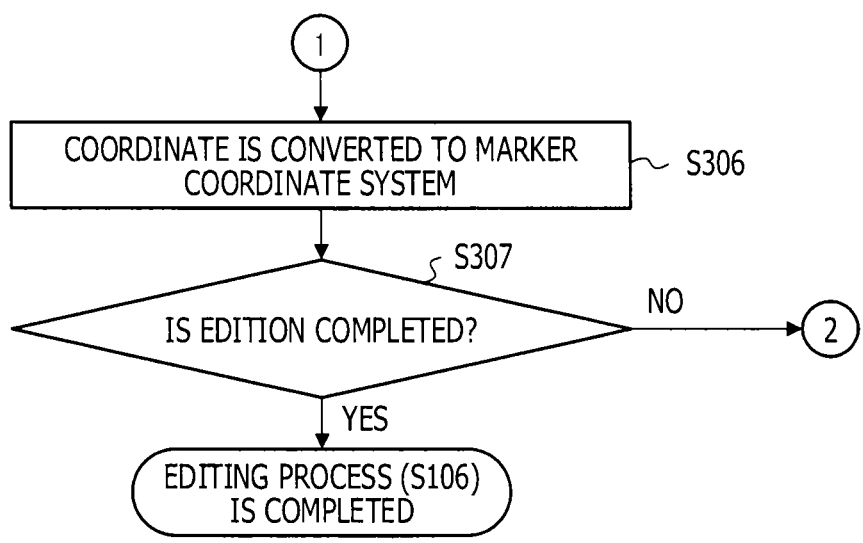
FIG. 24 illustrates an example of a processing procedure of an editing process.

FIG. 24 illustrates an example of a processing procedure of the editing process. In the procedure of S306, the control section 111 allows the calculation section 114 to perform the coordinate conversion of the coordinate of the camera coordinate system specified with respect to the AR object E to the coordinate of the marker coordinate system (S306). The conversion matrix used in S306 is an inverse matrix of the conversion coordinate M illustrated in FIG. 3.

If the process of S306 is performed, the control section 111 determines whether or not the edition is competed (S307). For example, the control section 111 allows the display section 14 to display requesting instruction to execute whether or not the edition is completed and, as a result, performs the determination of S307 according to input contents obtained by the input section 15. If the edition is not completed (S307: NO), the control section 111 returns to the process of S303.

If it is determined that the edition is completed in S307 (S307: YES), the control section 111 uploads the edited management table T3 to the management server of the AR data (S107). The edited AR object is managed using the object ID included in the received management table T3 and the identification information identifying the user or the computer 1 on the management server side. The control section 111 performs a transmitting process of the definition data and changes over the mode from the still image display mode to the marker detection mode, and the display section 14 updates from time to time the display of the captured image depending thereon. Next, the control section 111 determines whether or not the completion of the program is instructed (S108). In the process of S108, if the completion of the program is instructed (S108: YES), the control section 111 completes the process of the position specification program. In the process of S108, if the completion of the program is not instructed (S108: NO), the control section 111 returns to the process of S103.

In FIG. 22, if two-point position specification is performed within the screen, the data of the magnification within the edition table T4 is updated by motion of specified two points. If the specified two points are operated in a direction of the specified two points apart the amplitude is increased and if the specified two points are operated in a direction of the specified two points are approaching, the magnification is decreased.

In FIGS. 22 and 23, if an input to the rotation mode button B8 is detected, the rotary coordinate of the edition table T4 is updated according to the position specification within the screen.

In FIGS. 22 and 23, if an input to the numerical value specification mode button B9 is detected, the display section 14 displays a numerical value specification screen. The control section 111 displays the coordinate of the camera coordinate system within the edition table T4 in numerical value specification screen, directly inputs the numerical value with respect to the displayed coordinate value, and updates the coordinate value within the edition table T4 to the input numerical value.

A plurality of positions may be set with respect to the AR object E that is the object to be position-specified in S303. Even if an input to the editing completion button B1 is performed, the plurality of positions are set with respect to one AR object by control such as returning to S304 for a predetermined number of times. The management table T3 is configured to be capable of setting the plurality of positions.

The display of the AR object, in which the plurality of positions are set, is performed by displaying a plurality of projection images while sequentially changing over the plurality of projection images based on each setting of the plurality of positions. Thus, it is possible to display the AR object while moving the AR object.

Figure 25:
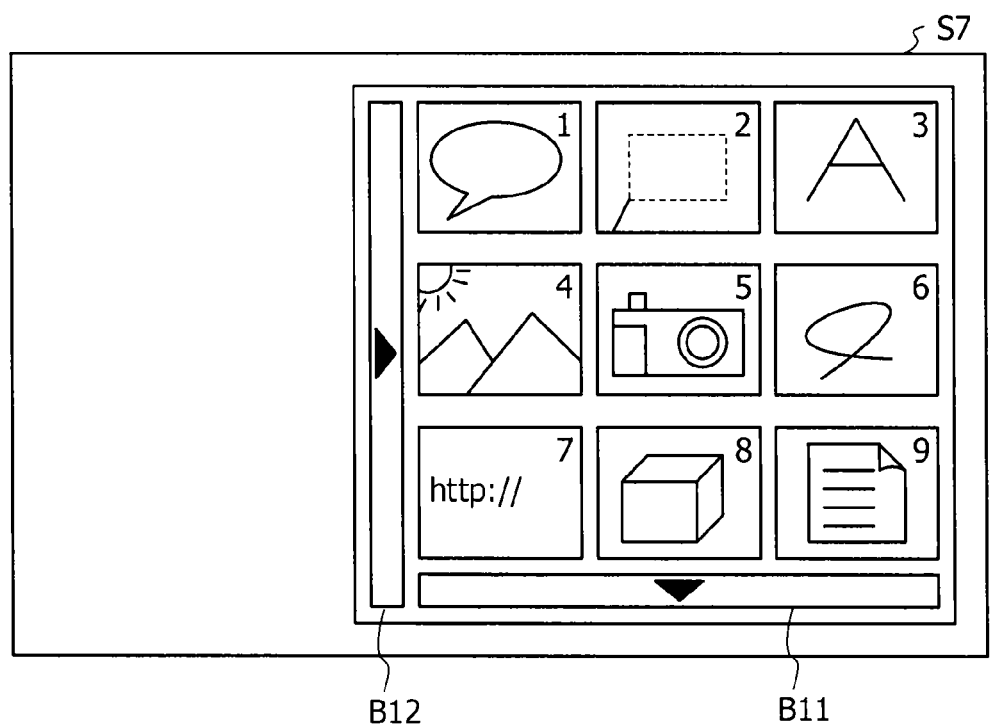
FIG. 25 illustrates an example of an AR template menu.

FIG. 25 illustrates an example of the AR template menu. In S303 illustrated in FIG. 20, the AR template menu is displayed. A display screen S7 illustrated in FIG. 25 is a display screen of a state where the AR template menu is invoked. A button group (button 1 to button 9) that is capable of selecting a type of the AR template is displayed in the AR template menu illustrated in FIG. 25. In the description of the AR template menu, the description is given by identifying a button based on the number of the button indicated within a button region. For example, a rectangular button in which the number of "1" is indicated is "button 1". Furthermore, the AR template menu includes a button group to be selectable in addition to the button group illustrated in FIG. 25 and includes a scroll button B11 for causing a scroll operation for displaying those button groups. Furthermore, the AR template menu includes a menu close button B12 to complete the selection of the AR template.

The button 1 to the button 9 respectively correspond to individual template ID. That is, a definition table corresponding to each button is provided. If an input is performed with respect to one button, the template ID corresponding to the button is selected and the definition table is invoked based on the selected template ID.

The button 1 is associated with the AR template of the balloon type. In the AR template of the balloon type, text information is added within the balloon-shaped figure. The button 2 is associated with the AR template of a drawer box type. The AR template of the drawer box type includes a lead line and a rectangular figure connected to an end of the lead line, and the text information is added within the rectangular figure. The button 3 is associated with the AR template of the text box type. In the AR template of the text box type, the text information is added with respect to a rectangular frame-shaped figure. The button 4 is associated with the AR template of a photo type. In the AR template of the photo type, the image data is mapped within the rectangular frame-shaped figure. For the image data, the image file stored in the storage section 12 is used. The button 5 is associated with the AR template of an imaging type. The AR template of the imaging type is the AR template similar to the AR template of the photo type, but obtaining destination of the image data is different. If the AR template of the imaging type is used, an imaging mode is invoked and the imaging process is performed by the imaging section 13. If the AR template of the imaging type is used, the image data that is imaged by the imaging process is mapped within the rectangular frame-shaped figure. The image data that is mapped in the photo type or the imaging type may be the still image or a video. The button 6 is associated with the AR template of a handwriting type. The AR template of the handwriting type is a transparent rectangular figure and a pattern of the figure is edited by a handwriting operation. The button 7 is associated with the AR template of a rink type and is a template similar to the AR template of the text box type. If the AR template of the rink type is selected, a list of Web pages is displayed and access information to a selected Web page from the list is added to the AR template. For example, the list of the Web pages is obtained from a bookmark of a Web browser or an access history. The button 8 is associated with the AR template of a figure type. In the AR template of the figure type, a three-dimensional model figure is defined. For example, a screen display may be performed to select a shape of the three-dimensional model figure according to an input to the button 8. The shape of the three-dimensional model figure is, for example, a cube, a cuboid, a cylinder, a sphere, a cone, a triangular prism, and the like. Furthermore, CAD data may be invoked according to the input to the button 8. For the CAD data, for example, a file of the CAD data stored in the storage section 12 is selected. The button 9 is associated with the AR template of a file type. The AR template of the file type is a rectangular figure in which an icon image indicating a file is mapped. If the AR template of the file type is selected, the file within the storage section 12 is selected and rink to the selected file is added to the AR template.

Figure 26:
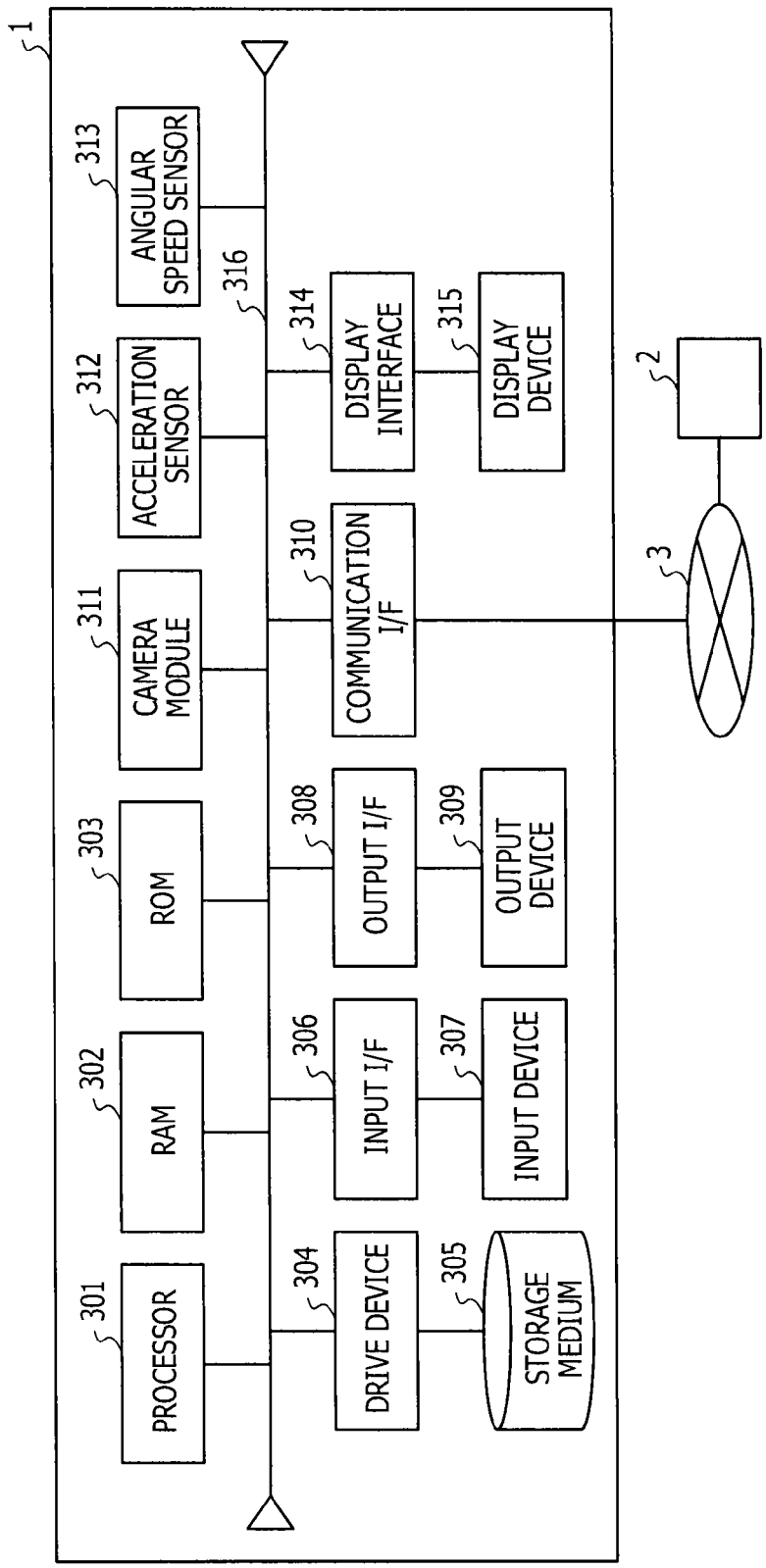
FIG. 26 illustrates an example of hardware configurations of a computer 1.

FIG. 26 illustrates an example of hardware configurations of the computer 1. For example, each functional block illustrated in FIG. 13 is realized by the hardware configurations illustrated in FIG. 26. For example, the computer 1 includes a processor 301, a random access memory (RAM) 302, a read only memory (ROM) 303, a drive device 304, a storage medium 305, an input interface (input I/F) 306, an input device 307, an output interface (output I/F) 308, an output device 309, a communication interface (communication I/F) 310, a camera module 311, an acceleration sensor 312, an angular speed sensor 313, a display interface 314, a display device 315, a bus 316, and the like. Respective hardware is connected via the bus 316.

The communication interface 310 performs control of communication through a network 3. The communication controlled by the communication interface 310 may be a mode to access to the network 3 through a wireless base station 4 (see FIG. 28) using wireless communication. The input interface 306 is connected to the input device 307 and transmits an input signal received from the input device 307 to the processor 301. The output interface 308 is connected to the output device 309 and allows the output device 309 to execute an output according to instruction of the processor 301. The input device 307 is a device for transmitting the input signal according to an operation. For example, the input signal is a key device such as buttons mounted on a keyboard or a body of the computer 1, or a pointing device such as a mouse or a touch panel. The output device 309 is a device for outputting information according to the control of the processor 301. For example, the output device 309 is a voice output device such as a speaker. The display interface 314 is connected to the display device 315. The display interface 314 displays image information written on the buffer for display provided in the display interface 314 by the processor 301 in the display device 315. The display device 315 is a device for outputting information according to the control of the processor 301. For the display device 315, an image output device such as display, a transparent type display, and the like are used. If the transparent type display is used, the projection image of the AR object is not synthesized to the captured image, but may be controlled to be displayed at an appropriate position within the transparent type display. Thus, the user obtains visual sense of a state where the real space and the AR object are aligned. Furthermore, for example, an input-output device such as a touch screen is used as the input device 307 and the display device 315. Furthermore, for example, instead to combine the input device 307 and the display device 315 within the computer 1, the input device 307 and the display device 315 may be connected to the computer 1 from the outside.

The RAM 302 is readable and writable memory device and, for example, a semiconductor memory such as a Static RAM (SRAM) and a Dynamic RAM (DRAM) or a flash memory other than RAM may be used. The ROM 303 includes a programmable ROM (PROM) and the like. The drive device 304 is a device that performs at least one of reading and writing of the information stored in the storage medium 305. The storage medium 305 stores information written by the drive device 304. For example, the storage medium 305 is at least one of storage media of types of a hard disk, a solid state drive (SSD), a compact disc (CD), a digital versatile disc (DVD), a Blu-ray the display screen, and the like. Furthermore, for example, the computer 1 includes the drive device 304 corresponding to a type of the storage medium 305 within the computer 1.

The camera module 311 includes an imaging device (image sensor), for example, reads a value measured by the imaging device, and writes the value in the image buffer for an input image included in the camera module 311. The acceleration sensor 312 measures acceleration acting on the acceleration sensor 312. The angular speed sensor 313 measures an angular speed of an operation by the angular speed sensor 313.

The processor 301 allows the RAM 302 to read a program (for example, a program illustrated in FIG. 27 and the like) stored in the ROM 303 or the storage medium 305 and performs a process according to a sequence of the read program.

Figure 27:
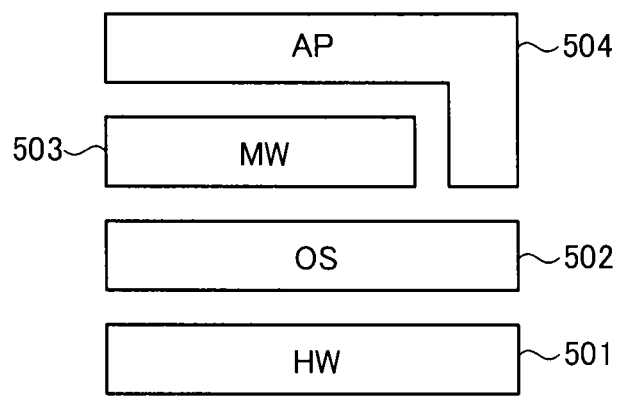
FIG. 27 illustrates an example of a configuration of a program that is operated by the computer 1.

For example, the processor 301 performs a process based on a position specification program that is a part of the program illustrated in FIG. 27 and thereby a function of the processing section 11 is realized. The control section 111 is realized by performing access to the RAM 302 by the processor 301 according to the procedure indicated in the position specification program and a calculation result of the processor 301. The recognition section 112 is realized by performing a calculation process by the processor 301 based on the image data stored in the image buffer for the input image of the camera module 311. The generation section 113 is realized by writing the image data generated by performing the calculating process based on the data (including the image data) stored in the RAM 302 by the processor 301 in the buffer for display. The calculation section 114 is realized by performing a calculation process by the processor 301 based on the data such as the coordinate and the data such as the conversion matrix stored in the RAM 302. In this case, the RAM 302 is used as a work area of the processor 301. A function of the storage section 12 is realized by storing a program file or a data file by the ROM 303 and the storage medium 305 or by using the RAM 302 as the work area of the processor 301. For example, the marker management table T1, the definition table T2, the management table T3, the edition table T4, and the like are stored in the RAM 302.

Furthermore, the camera module 311 writes the image data on the image buffer for the input image, the processor 301 reads the image data within the image buffer for the input image, and thereby a function of the imaging section 13 is realized. For example, in the monitoring mode, the image data is written on the image buffer for the input image and is written on the buffer for display of the display device 315 in parallel. Furthermore, the image data generated by the processor 301 is written on the buffer for display included in the display interface 314, the display device 315 performs display of the image data within the buffer for display, and thereby a function of the display section 14 is realized.

FIG. 27 illustrates an example of a configuration of a program that is operated by the computer 1. An operating system (OS) 502 performing control of a hardware group 501 (hardware illustrated in FIG. 26) is operated in the computer 1. The processor 301 is operated in a procedure in accordance with the OS 502, control and management of the hardware group 501 are performed, and thereby a process by an application program 504 or a middleware 503 is executed on the hardware group 501. In the computer 1, the OS 502, the middleware 503, and the program such as the application program 504 are, for example, read in the RAM 302, and are executed by the processor 301. Furthermore, the position specification program is, for example, a program that is invoked from the application program 504 as the middleware 503. Otherwise, for example, the position specification program is a program executing the position specifying process as the application program 504. The position specification program is stored in the storage medium 305. The storage medium 305 may be distributed separately from the body of the computer 1 in a state where the position specification program is stored.

Figure 28:
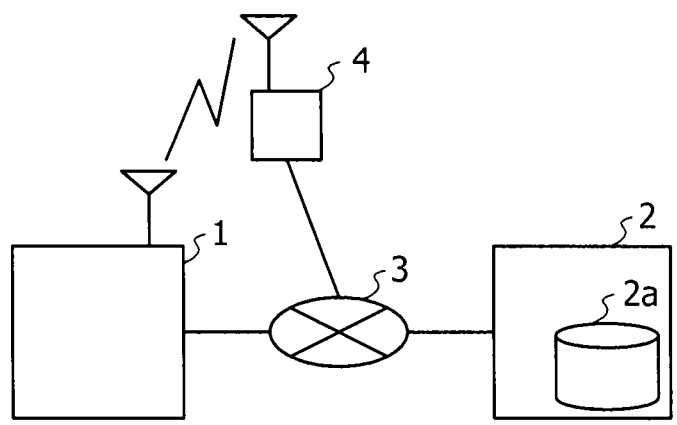
FIG. 28 illustrates an example of a system including the computer 1.

FIG. 28 illustrates an example of a system including the computer 1. The system illustrated in FIG. 28 includes the computer 1, a management server 2, a management database 2a, the network 3, and the wireless base station 4. The computer 1 and the management server 2 are capable of communicating by at least one of communication methods of wired communication and wireless communication. The management server 2 includes the management database 2a.

Figure 29:
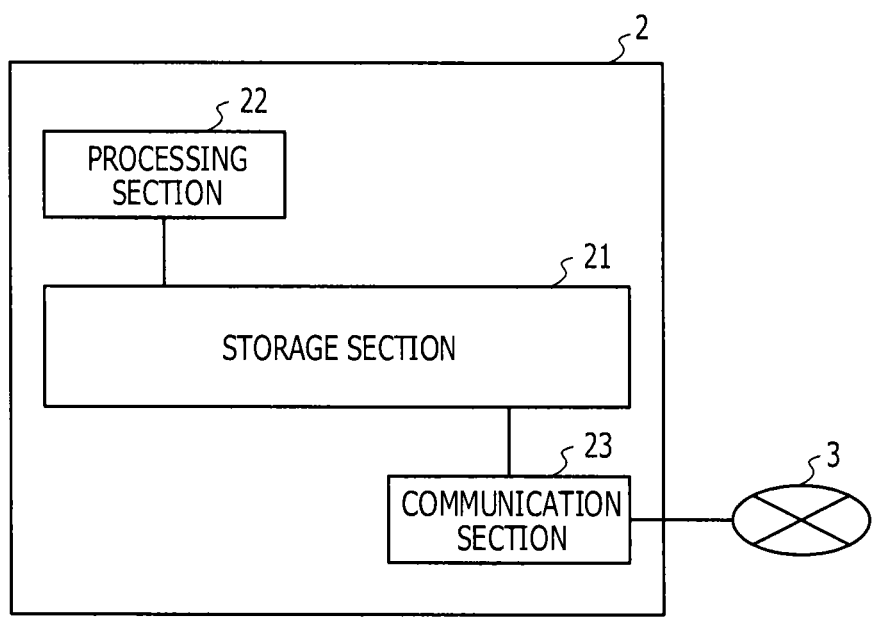
FIG. 29 illustrates an example of functional configurations of a management server 2.

FIG. 29 illustrates an example of functional configurations of the management server 2. The management server 2 includes a processing section 21, a storage section 22, and a communication section 23. The processing section 21 performs control of the storage section 22 and the communication section 23. The communication section 23 performs communicating with the communication section 16 of the computer 1. The storage section 22 stores information (management table T3) of the AR object obtained by communication of the communication section 23. Furthermore, if information of the AR object is requested from the computer 1, the processing section 21 allows the communication section 23 to execute a process to transmit information (management table T3) stored in the storage section 22.

FIG. 30 illustrates an example of hardware configurations of the management server 2. Each function block illustrated in FIG. 29 is realized by the hardware configurations illustrated in FIG. 30. For example, the management server 2 includes a processor 401, a RAM 402, a ROM 403, a drive device 404, a storage medium 405, an input interface (input I/F) 406, an input device 407, an output interface (output I/F) 408, an output device 409, a communication interface (communication I/F) 410, a storage area network (SAN) interface (SAN I/F) 411, a bus 412, and the like. Respective hardware is connected through the bus 412.

For example, the processor 401 is hardware similar to the processor 301. For example, the RAM 402 is hardware similar to the RAM 302. For example, the ROM 403 is hardware similar to the ROM 303. For example, the drive device 404 is hardware similar to the drive device 304. For example, the storage medium 405 is hardware similar to the storage medium 305. For example, the input interface (input I/F) 406 is hardware similar to the input interface 306. For example, the input device 407 is hardware similar to the input device 307. For example, the output interface (output I/F) 408 is hardware similar to the output interface 308. For example, the output device 409 is hardware similar to the output device 309. For example, the communication interface (communication I/F) 410 is hardware similar to the communication interface 310. The storage area network (SAN) interface (SAN I/F) 411 is interface for connecting the management server 2 to the SAN and includes a host bus adapter (HBA).

The processor 401 allows the RAM 402 to read a management program stored in the ROM 403 or the storage medium 405 and performs a process of the processing section 21 according to a procedure of the read management program. In this case, the RAM 402 is used as a work area of the processor 401. A function of the storage section 22 is realized by storing the program file or the data file (the management table T3 and the like) by the ROM 403 and the storage medium 405, or by using the RAM 402 as a work area of the processor 401. Furthermore, a function of the communication section 23 is realized by performing a communication process by controlling the communication interface 410 by the processor 401.

The embodiments described above are one aspect of the invention and design changes may be appropriately performed without departing from the spirit of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display method executed by a computer, the display method comprising:
   displaying an input image captured by a camera;
   receiving a first designation of a first point on the input image;
   detecting a specific object from the input image;
   generating display data for rendering a plan view, a first display component, and a second display component based on a positional relationship between the camera and the specific object, the plan view corresponding to a first plane which is different from a second plane projected on the input image, the first display component corresponding to the camera and being displayed at a camera position on the first plane, and the second display component corresponding to the reference object and being displayed at a reference object position on the first plane;

displaying the plan view, the first display component, and the second display component on a display based on the display data;

receiving a second designation of a second point on the plan view;

acquiring a position of the second point;

converting the position on the first plane into another position in a depth direction to the second plane;

generating positional information indicating a three dimensional position of an augmented reality content based on the another position and the first point; and storing the positional information and the augmented reality content into a memory, wherein the generating the display data for the rendering of the plan view includes executing a calculating process of a relative position between the reference object and the camera within the space based on the input image, and the generating the positional information is based on a first position in the plan view that is specified and the another position in the second plane.

2. The display method according to claim 1, wherein the plan view is an aerial view.

3. A display method executed by a computer, the display method comprising:

generating a plan view, which corresponds to a space in which a camera and a reference object are positioned, that includes information representing a positional relationship between the camera and the reference object in a first plane, the camera at a first position in the space and the reference object at a second position in the space, the reference object being in an input image captured by the camera, and the first plane being different from a second plane that is projected onto the input image;

displaying the plan view on a display device;

converting, based on the positional relationship between the camera and the reference object in the first plane, a position in the first plane into another position in a depth direction to the second plane;

generating positional information indicating a three-dimensional position of augmented reality content based on the another position in the second plane; and storing the positional information and the augmented reality content into a memory, wherein the generating the plan View includes executing a calculating process of a relative position between the reference object and the camera within the space based on the input image, and the generating the positional information is based on a first position in the plan view that is specified and the another position in the second plane.

4. The display method according to claim 3, wherein the generating the plan view includes executing a calculating process of a relative position between the reference object aid the camera within the space based on the input image.

5. The display method according to claim 3, further comprising:

storing object data of which a shape is determined by three-dimensional coordinates of the three-dimensional position;

generating a projection image that is an image indicating a state where the object data disposed within the space is projected to the camera based on the generated positional information; and displaying the generated projection image on the input image.

6. The display method according, to claim 5, further comprising:

displaying a figure corresponding to the object data at the first position within the plan view when the first position is specified; and displaying the figure corresponding to the object data displayed at the first position at a third position when the third position within the plan view is specified.

7. The display method according to claim 3, wherein the first position is specified depending on position specification on the display device on which the plan view is displayed.

8. The display method according to claim 3, wherein the plan view is displayed when specification of the second position is performed based on position specification within the input image.

9. A display device comprising:

circuitry configured to:

display an input image captured by a camera, receive a first designation of a first point on the input image, detect a specific object from the input image, generate display data for rendering a plan view, a first display component, and a second display component based on a positional relationship between the camera and the specific object, the plan view corresponding to a first plane which is different from a second plane projected on the input image, the first display component corresponding to the camera and being displayed at a camera position on the first plane, and the second display component corresponding to the reference object and being displayed at a reference object position on the first plane, display the plan view, the first display component, and the second display component on a display based on the display data, receive a second designation of a second point on the plan view, acquire a position of the second point, convert the position on the first plane into another position in a depth direction to the second plane, generate positional information indicating three dimensional position of an augmented reality content based on the another position and the first point, and store the positional information and the augmented reality content into memory, wherein to generate the display data for the rendering of the plan view, the circuitry is further configured to execute a calculating process of a relative position between the reference object and the camera within the space based on the input image, and the circuitry generates the positional information based on a first position in the plan view that is specified and the another position in the second plane.

10. The display device according to claim 9, wherein the plan view is an aerial view.

11. The display device according to claim 9, wherein the first point corresponds to a third position on the second plane, and the positional information is generated based on the another position and the third position.

\* \* \* \* \*